United States Patent
Welnicki et al.

(10) Patent No.: US 9,256,368 B2
(45) Date of Patent: Feb. 9, 2016

(54) SYSTEM AND METHOD FOR DEDUPLICATION OF DISTRIBUTED DATA

(75) Inventors: Michal Welnicki, Warsaw (PL); Jerzy Szczepkowski, Warsaw (PL); Cezary Dubnicki, Warsaw (PL)

(73) Assignee: NEC CORPORATION, Tokyo (JP)

( * ) Notice: Subject to any disclaimer, the term of this patent is extended or adjusted under 35 U.S.C. 154(b) by 691 days.

(21) Appl. No.: 13/640,130

(22) PCT Filed: Sep. 21, 2011

(86) PCT No.: PCT/JP2011/005301
§ 371 (c)(1),
(2), (4) Date: Oct. 9, 2012

(87) PCT Pub. No.: WO2012/042792
PCT Pub. Date: Apr. 5, 2012

(65) Prior Publication Data
US 2013/0036289 A1 Feb. 7, 2013

Related U.S. Application Data

(60) Provisional application No. 61/388,262, filed on Sep. 30, 2010.

(51) Int. Cl.
*G06F 3/06* (2006.01)
(52) U.S. Cl.
CPC ............ *G06F 3/0608* (2013.01); *G06F 3/0641* (2013.01); *G06F 3/0689* (2013.01)
(58) Field of Classification Search
CPC .... G06F 3/0608; G06F 3/0641; G06F 3/0689
See application file for complete search history.

(56) References Cited

U.S. PATENT DOCUMENTS

| 2002/0120763 A1 | 8/2002 | Miloushev et al. |
| 2008/0294696 A1 | 11/2008 | Frandzel |
| 2012/0030477 A1* | 2/2012 | Lu et al. ................ 713/189 |

FOREIGN PATENT DOCUMENTS

| JP | 2005-502096 A | 1/2005 |
| JP | 2005-353039 A | 12/2005 |

(Continued)

OTHER PUBLICATIONS

Communication dated May 13, 2014 from the Canadian Intellectual Property Office in counterpart Canadian Application No. 2811437.

(Continued)

*Primary Examiner* — Gary W Cygiel
(74) *Attorney, Agent, or Firm* — Sughrue Mion, PLLC

(57) ABSTRACT

The storage system includes a data storage controlling unit that stores a plurality of units of block data, generated by dividing storage target data, in a distributed manner in a plurality of storage devices, and performs duplicate storage elimination. The data storage controlling unit stores a plurality of continuous units of block data of the storage target data, generated by dividing the storage target data, in a particular storage device among the plurality of storage devices, stores, in the particular storage device, feature data based on the data content of the block data and storing position information representing the storing position in the particular storage device of the block data in association with each other as a storing position specifying table, and stores storage device identifying information for identifying the particular storage device and the feature data of the block data stored in the particular storage device in association with each other as a storage device specifying table.

9 Claims, 10 Drawing Sheets

(56) References Cited

FOREIGN PATENT DOCUMENTS

| JP | 2008-59398 A | 3/2008 |
|---|---|---|
| JP | 2010-79886 A | 4/2010 |
| JP | 2010-170475 A | 8/2010 |
| JP | 2010-176181 A | 8/2010 |
| JP | 2010-198276 A | 9/2010 |
| JP | 2010-204970 A | 9/2010 |
| JP | 2011-221733 A | 11/2011 |
| WO | 2010/086921 A1 | 8/2010 |
| WO | 2010/100813 A1 | 9/2010 |

OTHER PUBLICATIONS

Bhagwat, D et al. Extreme Binning: Scalable, Parallel Deduplication for Chunk-based File Backup. IEEE International Symposium on Modeling, Analysis & Simulation of Computer and Telecommunication Systems, 2009. Mascots '09, London, Sep. 21-23, 2009, pp. 1-9.

Office Action dated Aug. 27, 2013 issued by the Japanese Patent Office in counterpart Japanese Patent Application No. 2012-528164.

Dubnicki, Cezary, et al., "HYDRAstor: a Scalable Secondary Storage," 7th USENIX Cofernence on File and Storage Technologies, Feb. 2009, pp. 197-210.

Zhu, Benjamin, et al., "Avoiding the Disk Bottleneck in the Data Domain Deduplication File System," Fast'08: Proceedings of the 6th USENIX Conference on File and Storage Technologies, 2008, USENIX Association, pp. 269-282.

Birk, Yitzhak, "Random RAIDs with Selective Exploitation of Redundancy for High Performance Video Servers," IEEE, 1997, pp. 13-23.

Ungureanu, Cristian, et al., "HydraFS: a High-Throughput File System for the HYDRAstor Content-Addressable Storage System," FAST'10: Proceedings of the 8th USENIX Conference on File and Storage Technologies, 2010, USENIX Association, pp. 225-239.

Dubnicki, Cezary, et al., "FPN: A Distributed Hash Table for Commercial Applications," Proceedings of the Thirteenth International Symposium on High-Performance Distributed Computing (HPDC-13 2004), Jun. 2004, pp. 120-128.

Ben-Or, Michael, "Another Advantage of Free Choice: Completely Asynchronous Agreement Protocols," PODC '83: Proceedings of the second annual ACM symposium on Principles of distributed computing, 1983, ACM, pp. 27-30.

Lamport, Leslie, "The Part-Time Parliament," ACM Transactions on Computer Systems, May 1998, pp. 133-169, vol. 16, No. 2.

* cited by examiner

FIG. 1

| | Unique Block Address | Hash Address | HashAddress + UniqueBlockAddress hint |
|---|---|---|---|
| Address size | 10 | 20 | 30 |
| GBI Access On Read | Not required | Required | Not required |
| Block relocation | Not Possible | Possible | Possible |
| Healing through rewriting | Not Possible | Possible | Possible |
| Immediate hash lookup after write | Not required | Required | Not required |

SYSTEM AND METHOD FOR DEDUPLICATION OF DISTRIBUTED DATA

TECHNICAL FIELD

The present invention relates to a storage system, and in particular, to a storage system having a duplicate storage elimination function.

BACKGROUND ART

Deduplication for secondary storage systems has recently seen a lot of attention in both research and commercial applications. Deduplication offers significant reductions in storage capacity requirements by identifying identical blocks in the data and storing only a single copy of such blocks. Previous results have shown that significant duplication exists in backup data. This is not surprising, given that subsequent backups of the same systems are usually very similar.

Deduplicating storage systems vary on a number of dimensions. Some systems only deduplicate identical files, while others split the files into smaller blocks and deduplicate those blocks. The present invention will focus on block-level deduplication, because backup applications typically aggregate individual files from the filesystem being backed up into large tar-like archives. Deduplication on the level of files would not give much space reduction.

The blocks can be of fixed or variable size, with variable sized blocks typically produced by content defined chunking. Using content-defined variable-sized blocks was shown to improve the deduplication efficiency significantly.

Most systems eliminate identical blocks, while some only require the blocks to be similar and store the differences efficiently. While this can improve deduplication effectiveness, it requires reading the previous blocks from disk, making it difficult to deliver high write throughput. The present invention will therefore focus on Identical block deduplication in this paper.

(Overview of Deduplicating Storage)

A backup storage system is typically presented with long data streams created by backup applications. These streams are typically archive files or virtual tape images. The data streams are divided into blocks, and a secure hash (e.g. SHA-1) is computed for each of the blocks. These hash values are then compared to hashes of blocks previously stored in the system. Since finding a hash collision for secure hash functions is extremely unlikely, blocks with the same hash value can be assumed to be identical (so called Compare by Hash). Therefore, if a block with the same hash is found, the block is considered a duplicate and it is not stored. The identifiers of all blocks comprising the data stream are stored and can be used to reconstruct the original data stream on read.

CITATION LIST

Non Patent Literature

NPL 1: DUBNICKI, C., GRYZ, L., HELDT, L., KACZMARCZYK, M., KILIAN, W., STRZELCZAK, P., SZCZEPKOWSKI, J., UNGUREANU, C., AND WELNICKI, M. HYDRAstor: a Scalable Secondary Storage. In 7th USENIX Conference on File and Storage Technologies (San Francisco, Calif., USA, February 2009).

NPL 2: ZHU, B., LI, K., AND PATTERSON, H. Avoiding the disk bottleneck in the data domain deduplication file system. In FAST'08: Proceedings of the 6th USENIX Conference on File and Storage Technologies (Berkeley, Calif., USA, 2008), USENIX Association, pp. 1-14.

NPL 3: BIRK, Y. Random raids with selective exploitation of redundancy for high performance video servers. 671-681.

NPL 4: UNGUREANU, C., ARANYA, A., GOKHALE, S., RAGO, S., ATKIN, B., BOHRA, A., DUBNICKI, C., AND CALKOWSKI, G. Hydrafs: A high-throughput file system for the hydrastor content addressable storage system. In FAST '10: Proceedings of the 8th USENIX Conference on File and Storage Technologies (Berkeley, Calif., USA, 2010), USENIX Association, pp. 225-239.

NPL 5: DUBNICKI, C., UNGUREANU, C., AND KILIAN, W. FPN: A Distributed Hash Table for Commercial Applications. In Proceedings of the Thirteenth International Symposium on High-Performance Distributed Computing (HPDC-13 2004) (Honolulu, Hi., June 2004), pp. 120-128.

NPL 6: BEN-OR, M. Another advantage of free choice (extended abstract): Completely asynchronous agreement protocols. In PODC '83: Proceedings of the second annual ACM symposium on Principles of distributed computing (New York, N.Y., USA, 1983), ACM, pp. 27-30.

NPL 7: LAMPORT, L. The part-time parliament. ACM Trans. Comput. Syst. 16, 2 (1998), 133-169.

SUMMARY OF INVENTION

Technical Problem (Performance Challenges with Disk-Based Dedup)

To implement a large-scale deduplicating storage system, some significant performance challenges have to be overcome.

Large systems store so many blocks that their hashes don't fit into main memory. Using a simple on-disk index of hashes would lead to very poor performance due to index lookups, which are effectively random reads.

Some systems solve this problem by storing all incoming blocks temporarily and doing the deduplication offline. Since all new blocks are known in advance, the hash lookups can be rearranged into hash order, and the lookups can be performed efficiently in batch. However, offline deduplication requires a large, high-performance staging area for the temporary block storage. Inline deduplication systems, on the other hand, can avoid writing duplicate blocks altogether, offering higher write performance in the typical, highly-duplicated case.

Most systems such as one disclosed in NPL 1 solve this problem by relying on the stream locality observation—typically, duplicate blocks in subsequent backups appear in similar sequences to those from the original backup. By preserving the locality of backup streams, hashes of many duplicate blocks can be prefetched effectively. Non-duplicate blocks can be efficiently identified by using in-memory Bloom filters or by settling for approximate deduplication, trading some deduplication possibilities for better performance.

Another problem is decreased streaming read performance due to stream fragmentation. Since duplicate blocks are stored in a different location than the newly written blocks, seemingly large, sequential reads are internally broken down into multiple shorter reads. This problem is inherent in systems doing exact deduplication—if two streams are stored in the system, with one being a random permutation of the other, at least one of the streams will have to issue small, random reads. In practice, the same stream locality observation which allowed efficient deduplication makes this worst-case unlikely. However, as the fragmentation typically increases with the age of the system, care should be taken not to diminish the internal locality further by bad data placement.

(Scalable Global Deduplication)

Centralized systems, as described in NPL 2 for example, have limited scalability in terms of system size. Several independent systems can be set up to scale the capacity, but that defeats deduplication between them and increases the maintenance burden by fixing backups to isolated storage islands.

Some systems (NPL 1) introduce scalable global-scope deduplication by assigning blocks to storage nodes based on the hash. This effectively partitions the large block index onto all nodes, with each node responsible for a portion of the hash space.

Though this architecture provides scalability and good performance in a single-client setting, performance problems can arise when multiple clients are reading or writing simultaneously.

Degradation of Stream Locality

Since blocks are distributed across all nodes uniformly, every node, on average, receives a portion of the input stream scaled down by a factor of the system size. This causes a significant reduction of stream locality in large systems—any stream locality present in the original stream will also be reduced by this factor within each node.

Reading back any significant portion of a stream requires participation of all nodes in the system. If many clients attempt to read back (different) streams simultaneously, they will have to compete for the same resources on each of the nodes. To maintain high throughput, the storage nodes would require a read cache size proportional to the number of clients—this is known as the buffer explosion problem (NPL 3). The problem is compounded by the degradation in stream locality, which diminishes the efficiency of prefetching. In result, in very large systems, sequential reads of the original stream will degenerate to random reads within the storage nodes.

The same problems apply to deduplication lookups—prefetching of existing blocks' hashes will also degenerate to random reads. However, the negative effects are less pronounced for deduplication, because hashes are much smaller than block data and will more easily fit into modest-size caches.

Symmetric Network Throughput

Due to the uniform distribution of blocks to storage nodes, all nodes receive roughly the same number of blocks from a client. When the number of clients grows, the network throughput requirements also grow, to accommodate all the non-duplicate block writes.

In result, a network with very high, symmetric, point-to-point throughput is necessary for the system to provide high write throughput. As will be discussed below, building such networks for large systems is difficult.

As such, an exemplary object of the present invention is to prevent performance deterioration of a storage system with deduplication, which is the problem to be solved as described above.

Solution to Problem

According to an aspect of the present invention, a storage system includes a data storage controlling unit that stores a plurality of units of block data, generated by dividing storage target data, in a distributed manner in a plurality of storage devices, and when attempting to store, in a storage device, another piece of storage target data having a data content identical to the data content of storage target data having been stored in a storage device, performs duplicate storage elimination by referring to the storage target data having been stored in the storage device as the other storage target data.

The data storage controlling unit stores a plurality of continuous units of block data of the storage target data, generated by dividing the storage target data, in a particular storage device among the plurality of storage devices, stores, in the particular storage device, feature data based on the data content of the block data and storing position information representing the storing position in the particular storage device of the block data in association with each other as a storing position specifying table, and stores storage device identifying information for identifying the particular storage device and the feature data of the block data stored in the particular storage device in association with each other as a storage device specifying table.

According to another aspect of the present invention, a computer-readable medium storing a program is a medium storing a program including instructions for causing an information processing device to realize a data storage controlling unit that stores a plurality of units of block data, generated by dividing storage target data, in a distributed manner in a plurality of storage devices, and when attempting to store, in a storage device, another piece of storage target data having a data content identical to the data content of storage target data having been stored in a storage device, performs duplicate storage elimination by referring to the storage target data having been stored in the storage device as the other storage target data, wherein the data storage controlling unit stores a plurality of continuous units of block data of the storage target data, generated by dividing the storage target data, in a particular storage device among the plurality of storage devices, stores, in the particular storage device, feature data based on the data content of the block data and storing position information representing the storing position in the particular storage device of the block data in association with each other as a storing position specifying table, and stores storage device identifying information for identifying the particular storage device and the feature data of the block data stored in the particular storage device in association with each other as a storage device specifying table.

According to another aspect of the present invention, a data storing method is a method for storing a plurality of units of block data, generated by dividing storage target data, in a distributed manner in a plurality of storage devices, and when attempting to store, in a storage device, another piece of storage target data having a data content identical to the data content of storage target data having been stored in a storage device, performing duplicate storage elimination by referring to the storage target data having been stored in the storage device as the other storage target data. The method includes storing a plurality of continuous units of block data of the storage target data, generated by dividing the storage target data, in a particular storage device among the plurality of storage devices, storing, in the particular storage device, feature data based on the data content of the block data and storing position information representing the storing position in the particular storage device of the block data in association with each other as a storing position specifying table, and storing storage device identifying information for identifying the particular storage device and the feature data of the block data stored in the particular storage device in association with each other as a storage device specifying table.

Advantageous Effects of Invention

As the present invention is configured as described above, the present invention is able to improve the performance of a storage system with deduplication.

BRIEF DESCRIPTION OF DRAWINGS

FIG. 1 is a table showing block address types in pointer blocks in a first exemplary embodiment;

DESCRIPTION OF EMBODIMENTS

First Exemplary Embodiment

Figure 2:
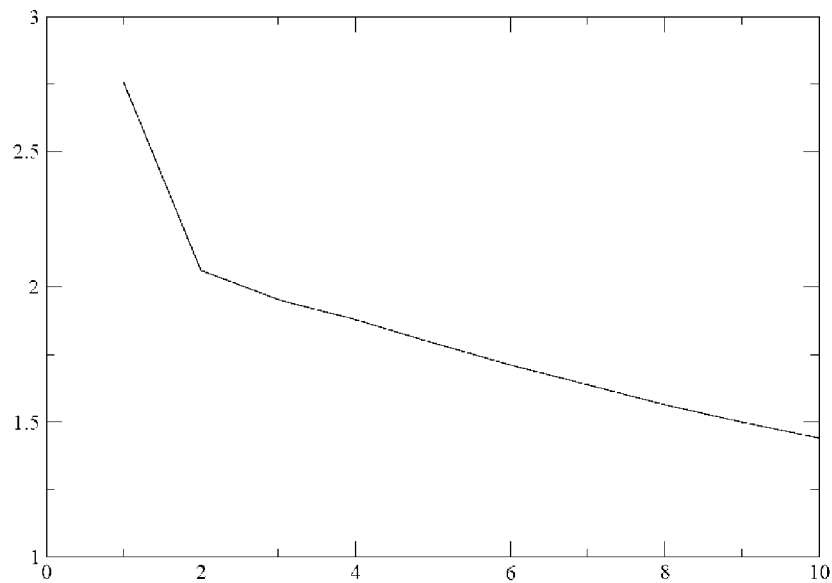
FIG. 2 is a chart showing an effect of load due to system size enlargement on the write bandwidth in the first exemplary embodiment.

The present invention introduces a new architecture for a scalable storage system with global inline deduplication. By separating data storage from indexing of duplicates, the proposed system improves on the shortcomings of the existing systems: degradation of restore performance with system size, and the requirement of uniform bandwidth between all nodes.

A first exemplary embodiment is organized as follows. First, the requirements and assumptions considered when designing the system will be introduced. Then, an architecture fulfilling those requirements will be described, and key operations on the proposed data organization will be explained. Then, how the proposed system delivers required features will be evaluated, and the trade offs faced during its design will be presented.

(Requirements and Assumptions)

Before describing the proposed system architecture, we will overview the requirements and assumptions of the environment in which it will function.

(Storage System Requirements Overview)

The main application of the storage system will be backup. To maximize savings on deduplication, the storage system will store backups of many client systems. This environment requires high capacity and reliability and has some unique performance characteristics. Since backups have to complete in short backup windows, very high aggregate write throughput is necessary. The system is write-mostly—data is written much more frequently than it is read. Reads happen primarily during restores, when the backed up systems encounter a failure. Since time to restore the system is usually critical, reasonably high read throughput is necessary.

For reasons described above, deduplication implemented by the storage system should meet the following criteria:
Block-level
Identical block
Variable-sized block, with block boundaries set by Content Defined Chunking.
Compare-by-hash
Exact
Inline
Distributed
Global scope.

To keep costs down, the system should be constructed from commodity machines, and should be scalable up to 100 s/1000 s of nodes, corresponding to petabytes of raw storage.

Interface

The system has to provide industry-standard backup interfaces to client machines. In the context of disk-to-disk backup, this is usually a filesystem exported as a NAS (Network Attached Storage) or VTL (Virtual Tape Library).

Since the details of NAS or VTL implementation are irrelevant to the topic of the present invention, we will focus on a simpler block store interface, similar to the one described in NPL 1. A filesystem can be built on top of such a block store, as described in NPL 4.

In short, the block store allows storing variable-sized blocks of data. The blocks are immutable, and they can be retrieved through an address generated by the block store. Deduplication is done by assigning the same address to blocks with identical contents.

Special Pointer Blocks can be used to organize individual data blocks into large data streams. These blocks contain addresses of the blocks which they point to—either regular data blocks or other Pointer Blocks. Like regular blocks, Pointer Blocks are immutable and identical ones are deduplicated. A tree of Pointer Blocks, with regular data blocks in the leaves, can be constructed to represent a data stream. The address of the Pointer Block at the root of such a tree is sufficient to retrieve the whole stream.

(Network Model)

The storage system requires an internal network to scale to the large capacities required, as well as to connect the data sources—i.e. the client backup machines. The network has to provide high throughput, both between nodes of the storage system and on links to the data sources.

As the size of the system grows, building a large network with high aggregate throughput between all nodes becomes difficult and expensive. Traditionally, networks in large data centers are built in a hierarchical manner, with individual machines connected by first-level switches (e.g. 1 Gbit), and the first-level switches connected by faster second-level switches (e.g. 10 Gbit) etc. Links between switches need to be faster to provide reasonable aggregate throughput, which drives up network hardware costs when using faster interconnects, or cabling complexity when bonding multiple physical links.

Naturally, the hierarchical structure does not occur in small systems, where all nodes can be connected to the same first-level switch and identical, high throughput is achievable between all nodes. Also, given enough resources, a large network with high aggregate throughput can be constructed even out of commodity networking hardware.

Therefore, the storage system should be adaptable to both:
a hierarchical network with high intra-switch throughput but lower aggregate inter-switch throughput, and
a symmetric network with the whole cross-section bandwidth available between any two nodes.

(Client System Performance Limits)

Data written or read from the storage system eventually has to pass through a client machine (a backup server). Each client backup server has limited resources for sourcing and sinking data—either the local disks or the network connection become a bottleneck.

Therefore, it is not necessary for the storage system to provide high throughput for a single stream; the resources of a single client machine will be easily exceeded by a small number of nodes of the storage system (e.g. a dozen). However, the system should still provide good combined performance, when multiple streams are concurrently read/written from multiple client machines.

(Architecture)

(Overview)

The storage system proposed in the present invention is made of the following types of nodes:

Access Nodes which act as gateways into the system and connect to client machines, Storage Nodes which actually store data blocks and Index Nodes responsible for identifying and locating duplicates.

Nodes of different functions can optionally be combined on the same physical machine if it proves beneficial due to hardware considerations (e.g. power consumption, cooling, datacenter space use).

To meet the requirements described above, the present invention proposes a storage system implementing the following design objectives.

Locality Preserving Storage

Sequences of non-duplicate blocks belonging to one stream are stored close together on a small subset of Storage Nodes. This preserves the stream-based locality mentioned above, allowing efficient sequential reads during restores. It is also important for duplicate elimination performance, enabling effective prefetching of duplicate blocks' hashes.

This approach is in contrast with previous inline global deduplication systems as described in NPL 1. These systems combined duplicate indexing and block storage, forcing blocks to be uniformly distributed across the whole system. While they also try to preserve stream locality within a Storage Node, the initial partitioning decreases its efficiency.

Global Hash-Based Indexing

Since the Storage Node on which a block is written no longer depends on the block's hash, a separate block index has to be maintained. This index is partitioned across all Index Nodes in the system, based on the block hash. Hashing is appropriate here since there is no locality in the hash space anyway, and it provides good scalability, parallelism and load balancing.

Storage Capacity Balancing

The stream locality preservation only makes sense up to some maximum stream length, determined by the efficiency of sequential disk accesses. Once enough sequential blocks are accumulated in one location, further blocks can be stored elsewhere. Therefore, the nodes to which non-duplicate blocks of a given stream are written change over time. This helps maintain good capacity balancing, preventing some Storage Nodes from filling up faster than others.

Asymmetric Network Performance

Since data location is not determined by the block hash, the proposed system is free to keep data on Storage Nodes close to the client machine which wrote that data. This can greatly improve write bandwidth in non-symmetric networks by avoiding data transfers across higher-level switches and the associated network throughput bottlenecks. Only deduplication queries need to be sent uniformly to all nodes in the network, but they are much smaller and don't require significant bandwidth. A description of the logical components from which the system is composed follows.

(Front-End)

The front-end exports a filesystem, VTL or similar image of the data to the client. It chunks the incoming write stream to variable-sized blocks and submits them for deduplication and storage. It is hosted on the Access Nodes. This portion of the system can be identical to that present in HYDRAstor, described in NPL 1.

(DHT Network Overlay)

A Distributed Hash Table combined with distributed consensus is used to implement a Network Overlay layer. The DHT is the basis of the system's scalability. The Network Overlay provides:

virtualization of object location, allowing efficient mapping of logical objects to physical machines in the face of failures and system reconfigurations failure detection and tolerance load balancing (assuming uniform distribution of objects in the DHT's key space)

propagation and maintenance of small, system-wide state (Global State).

(FPN with Supernodes)

The DHT used in the present invention is the Fixed Prefix Network (NPL 5) with Supernodes. Its use in a storage system was already described in NPL 1; only the Overlay's functionality in the context of this system is summarized here.

The overlay network maps keys (hashes) to a set of nodes which are responsible for these keys. It is organized into Supernodes, each Supernode consisting of a constant number of Supernode Components. The Supernode Components are hosted on physical nodes (in this case, Index Nodes and Storage Nodes). The number of Components per Supernode—the Supernode Cardinality (SNC) is fixed for a given instance of FPN. Components which are members of the same Supernode are called Peers.

Each Supernode is responsible for a portion of the hash key space; the hash spaces partitioned between the Supernodes, such that the whole space is covered and there is no overlap in responsibility between Supernodes.

Node failures are handled within Supernodes—all Components of a given Supernode continuously ping each other the detect failures and propagate state changes. When a node fails, the components which were hosted on that node are recovered by the remaining Peers.

A distributed consensus algorithm described in NPL 6 or 7 is used to assure that all Components have a consistent image of the Supernode's membership. To maintain quorum for the consensus, over half of the SNC Components from each Supernode have to survive at all times. This also prevents network partitions from causing "split brain" operation.

FPN also provides a level of Load Balancing. It attempts to spread components between physical machines in proportion to the resources available on them. The underlying assumption is that each Supernode will receive roughly the same load (both in terms of used capacity and requests per second). It also prevents co-locating Peer Components on the same physical node to improve failure tolerance.

A different DHT implementation could easily be used in place of FPN, as long as it was extended to provide fault tolerance and Global State broadcasts. The use of FPN with Supernodes in the present invention is motivated by its successful use in the HYDRAstor system.

(Data and Index FPNs)

There are two separate instances of the DHT in this system:

"Data FPN" which maps logical data locations to Storage Nodes which are responsible for storing them. Components of the Data FPN are hosted on Storage Nodes. This mapping provides virtualization of data locations—the logical locations don't change on system reconfigurations or failures, even if the Storage Nodes hosting the data changed. The Data FPN will be described in detail later.

"Index FPN" which maps block hashes to the Index Nodes which maintain translations for that hash. Components of this network are placed on Index Nodes. It is described in detail later.

Using separate FPN networks for Index Nodes and Storage Nodes allows these types of nodes to be placed on different hardware. For example, Index Nodes may require much CPU power, RAM and IOPS, while Storage Nodes should provide lots of storage capacity as well as high disk and network throughput.

Even if components of these two networks are placed on the same physical machines, load balancing can usually be done independently within each network, because as noted above, they utilize different resources. Also, the two networks can have different Supernode Cardinality (respectively $SNC_{Index}$ and $SNC_{Data}$), and can grow independently (FPN splits need not be synchronized between them).

(Block Store)

(Data Organization Overview)

All user data stored in the system is kept as blocks by the Data FPN Components. The blocks are erasure-coded into $SNC_{Data}$ fragments, some original and some redundant. The ratio of original to redundant fragments is determined by the resilience class assigned to the data by the user. Blocks are assigned to Data FPN Supernodes when they are written. The details of the allocation policy will be presented later.

Synchruns and SCCs

Within a Data FPN Supernode, the stored blocks are grouped into Synchruns. Fragments belonging to the same block are put into corresponding Synchrun Components of the Synchrun. There are $SNC_{Data}$ Synchrun Components for each Synchrun, corresponding to fragments number 0 through $SNC_{Data}-1$. Synchruns are atomic units of processing for data synchronization operations—blocks never cross synchrun boundaries during background maintenance operations.

An integral number of Synchrun Components is grouped into a Synchrun Component Container (SCC); the SCCs are stored on StorageNode data disks. SCCs are append-only—when an entire SCC is written, it becomes immutable. Subsequent background operations can only modify the SCC by rewriting it.

The grouping of Synchrun Components into SCCs is done to bound the number of entities which have to be tracked by a Storage Node—Synchruns will shrink in size as blocks are deleted from the system. The sizes of SCCs are maintained at roughly the initial size of one Synchrun Component (about 64 MB), by concatenating consecutive Synchruns when their sizes go down.

Streamruns

A number of consecutive Synchruns is grouped into a Streamrun. This grouping is static and decided at the time a Synchrun is allocated. A Streamrun corresponds to a run of blocks from the same stream which should be kept in the same Supernode for good locality—they are a unit of storage balancing.

There is a tradeoff between the locality preservation and capacity balancing quality, which can be controlled by the size of Streamruns. This tradeoff will be explored in more detail below.

(Identification of Synchruns)

Each synchrun is identified by a 64-bit identifier. The Synchrun Id statically determines the Supernode to which a Synchrun belongs.

The Synchrun Id is logically divided into 3 parts:
the supernode zone prefix
the Streamrun id within that supernode
the sequence number within that Streamrun The number of bits for the sequence number is fixed; the number of bits interpreted as supernode prefix increases as the system grows and the length of the Data FPN zone prefixes increase. The details will be described later.

(Block Identification and Fragment Lookup)

All blocks stored in the system are assigned a sequence number within the Synchrun in which they were written. This sequence number combined with the Synchrun Id uniquely identifies the block within the entire system. The (SynchrunId, BlockSeqNum) pair is therefore called the UniqueBlockAddress. This address is never reused, even if the block is later removed.

(Write Initiator)

Requests to store new blocks in a given Supernode always go through a fixed Component of that Supernode—the Write Initiator. The Initiator is responsible for assigning a unique block identifier within the Synchrun and coordinating the write operation with other Components of the Supernode and with the Index FPN.

(SCC Index)

Apart from raw fragment data, each SCC stores metadata of fragments belonging to the SCC. This metadata contains, among others, the block's hash, its unique block id, size, and the location of the fragment's data in the SCC.

This metadata is stored separately from the data, in the SCC Index. The SCC Index can thus be read and updated quickly, without having to skip over the fragment data.

Reading metadata of an individual block from the SCC Index is also possible, if the position of the fragment within the SCC is known. Due to block deletions, the unique block id alone does not determine the fragment position; it has to be looked up externally.

(Global Block Index)

The Global Block Index is a distributed hash table which maps hashes of stored blocks to their unique block identifiers (i.e. (SynchrunId, BlockSeqNum) pairs). It is implemented on top of the Index FPN.

The hash table is partitioned based on a prefix of the block hash key. The node responsible for storing a given block hash is the one which hosts an Index FPN Component with the zone corresponding to the hash. Within an Index Node, the mappings are stored in an on-disk hash table.

The Global Block Index is failure tolerant, with each zone replicated on all $SNC_{Index}$ components of the supernode.

Due to its size, the index is stored on disk. Updates are buffered in memory and applied in batch in the background. The index supports cheap queries for non-existent blocks, by using an in-memory bloom filter. Queries for existing blocks require one random disk read.

(Disk Compacted Index)

Within each StorageNode, the Global Block Index is kept in an on-disk data structure called the Disk Compacted Index (DCI). The DCI needs to identify non-duplicate blocks with high performance.

The DCI can be implemented on top of standard disks, as an on-disk hash table with in-memory Bloom Filter for negative (non-duplicate) queries. This is similar to the indexes described in NPL 2.

In this solution, all updates—translation inserts and removes—are put into an in-memory buffer to avoid random writes. The on-disk hash table, the write buffer and Bloom filter are partitioned into buckets, with each bucket corresponding to a portion of the key space. When the write buffer begins to fill up, a background sweep operation processes each bucket in sequence:

reads the on-disk hash table bucket
applies any updates from the write buffer
rebuilding the Bloom Filter portion for the bucket
flushes the updated bucket to disk Alternatively, the index can be stored on Flash-based SSDs. This has been studied in recent research and has the advantage of reduced RAM consumption and possibility of substantial power savings.

To cut down the size of the hash table, DCI does not need to store the whole key (block hash) explicitly. In case of collisions in the hash table, all matching translations are returned. These candidate blocks can then be verified by reading their metadata from the appropriate SccIndex and checking if the full block hash matches. If additionally several bits of the key are stored in DCI, the number of candidates can be kept close to 1 on average.

(Block Index Updates)

The Global Block Index is updated after a block is successfully written to its synchrun, and when it is removed by the Garbage Collection process. Since the Index Node responsible for hosting a block's zone in the Global Block Index is usually different from the Storage Node which actually stores the block, careful synchronization of the index updates is necessary.

A Hashkey to (SynchrunId, BlockSeqNum) translation is created for each newly written block by the Write Initiator writing the block in the Data FPN. This translation is sent to the Index Node hosting the appropriate Block Index zone. It is then stored in the destination Index Node's Translation Log, and will be written out to the DCI in the background. As soon as the translation is persistent in the Translation Log, the Index node replies to the Write Initiator.

Since translation insert requests can be lost, each Write Initiator maintains a (persistent) log of translations which have to be inserted into the Global Block Index. Insert requests for translation from the log are retransmitted periodically until a successful reply from the Index node is received.

The Index node can receive duplicated translation insert requests. Since the (SynchrunId, BlockSeqNum) is unique for every write, duplicate inserts can be safely discarded. The duplicate inserts will commonly be detected while they're still in the DCI write buffer, but they can be removed on DCI sweep as well.

(Removals)

Translations are removed from the Global Block Index only due to Garbage Collection. In the simplest solution, the entire Global Block Index can be rebuilt from remaining blocks after Garbage Collection is finished. A more sophisticated solution, described below, is also possible.

For the purpose of Garbage Collection, the lifetime of the system is divided into phases called Epochs. All block writes in the system are performed in an Epoch. The current Epoch number is maintained in the Global State and is advanced when the Garbage Collection process starts. The Epoch can advance to n+1 only after all blocks from Epoch n−1 have been added to GBI. Garbage collection in Epoch n only removes blocks stored up to Epoch n−2 (i.e. only those which are definitely in GBI already).

These phases help avoid races between GBI translation updates, block removals and GBI translation removals. GBI insert requests (Translation Log entries) are stamped with the Epoch number; requests from a too old Epoch are dropped as duplicates by the receiving Index Node. If garbage collection decides that a block should be removed, a remove request for its translation is sent. The request is also stamped with the current Epoch. If the block is ever stored again, it will be in a different synchrun and so it will be a different translation.

(Hash Leases)

A translation is added to the Global Block Index only after its block has been successfully stored in a synchrun. This can lead to a race if two or more clients attempt to write the same block concurrently, and multiple copies of the same block can be stored.

To prevent the race, the client acquires a lease for the block's Hash from the Global Block Index before the block is submitted for storage. A taken lease signals other potential writers that the block is already being written and that they should synchronize with the original writer. The lease is returned when an actual Translation is inserted for the same hash, if the write fails or if the lease expires (e.g. because the original Access Node from handling the write stopped responding).

(Translation Cache)

The Translation Cache is an in-memory cache of SCC Indexes, used for efficient deduplication against already stored blocks. It takes advantage of the locality of duplicate blocks within a data stream (runs of duplicate blocks tend to be rewritten in the same order in which they were originally stored).

The Translation Cache is located on Access Nodes. Each Access Node consults its local Translation Cache when deciding whether a block is duplicated. The cache can be populated by downloading an SCC Index from the Storage Node which hosts it. As the cache has limited capacity, an SCC Index whose translations were not recently used can be removed from the cache.

SCC Indexes stored in the Translation Cache can become stale if the underlying SCC changes. Since contents of the Translation Cache are always verified at the Storage Node before use, they can be dropped from the cache lazily, if the verification fails.

(Operation)

Next, how common operations are executed in the data organization presented above will be described.

(Writes and Duplicate Elimination)

Writes from the user are first processed by the frontend of an Access Node, where they are divided into variable-sized blocks and a tree of blocks is constructed. For each block, its SHA-1 hash key is computed, which will be used to decide whether the block is unique or duplicate.

(Duplicate Blocks)

The block's hash key is first looked up in the Translation Cache. If it is present there, the synchrun and unique block id of a candidate original block is found. Using the synchrun id, a request is sent to its Storage Node to verify that the Translation Cache entry is not stale and that the block has sufficient resilience for the write to be deduplicated against it. If this verification passes, the write operation completes.

If the block is not found in the Translation Cache or does not pass verification, a query for the block's hash key is sent to the Global Block Index. It is delivered to the appropriate Index Node by routing through the DHT. The Global Block Index is then read and a set of candidate block locations is returned.

The candidates are then verified one-by-one (actually, there is just one candidate on average). For each candidate, a request is sent to the Storage Node hosting its synchrun. Using the unique block id, the fragment metadata location is looked up and read from the SCC Index. The fragment metadata contains the block's hash, which can be compared to the hash of the new block. If they match, and the block has sufficient resilience, a duplicate is found. Otherwise, remaining candidates are checked.

If a duplicate block was eliminated, the SCC Index of the original block is considered for reading into the Translation Cache to speed up subsequent duplicate elimination.

(Unique Blocks)

If the Translation Cache did not contain any usable entry, the Global Block Index is consulted. If the block was not yet in the Global Block Index, a negative answer can be returned without any disk access with high probability, thanks to the use of a Bloom filter. If no candidate was found, or all the candidate blocks were rejected, the block is unique and will be stored.

The Access Node maintains one Open Synchrun for each data stream being written. All new blocks are stored in this synchrun. If there is no open synchrun for the stream, or the previous synchrun's capacity was exceeded, a new synchrun is allocated.

Once an open synchrun for the block is selected, the block is erasure-coded into $SNC_{Data}$ fragments, and the fragments are sent to components of the supernode hosting the open synchrun. One of the components, the Write Initiator, is responsible for synchronizing the write operation. It sends a request to insert a translation for the block being stored to the Global Block Index. It collects confirmations of storage of the $SNC_{Data}$ fragments, and replies to the Access Node with success or failure.

(Synchrun Allocation)

New Synchruns are always created by the Write Initiator of the Supernode responsible for the Synchrun. The Write Initiator knows which Streamruns and which Synchruns within those Streamruns were allocated previously and can guarantee that the newly allocated Synchrun has a unique id.

An Access Node needs to allocate a Synchrun in two cases:
before writing the first unique block of a new stream
when the previous Synchrun is full.

If the Access Node already had a Synchrun open for the stream, it will normally try to allocate the next Synchrun in the same Streamrun. Since a Streamrun Id determines the Supernode, an allocation request can be sent through the Data FPN to the appropriate Write Initiator. If the allocation succeeds, the Write Initiator will assign the next Synchrun Id and return it to the Access Node. The Access Node will then submit all new writes with this Synchrun Id. If the allocation fails, either because the Streamrun is full or the Supernode is out of space, the Access Node has to allocate a new Streamrun.

To allocate a new Streamrun, the Access Node first chooses a new Supernode to host it. The Supernode is selected by looking up a random key in the Data FPN and sending an allocation request to the Write Initiator responsible for that key. If the allocation is successful, the Id of the first Synchrun of the new Streamrun is returned to the Access Node. Otherwise, the Access Node selects another Supernode. This basic allocation policy can be modified to provide features such as support for non-symmetric networks.

Normally, a separate Synchrun is allocated for each client stream. However, since each open Synchrun requires some resources on the Storage Node side, there is a limit on the maximum number of concurrently open streams per Supernode. If too many streams are written at the same time, the same Synchrun will be used by more than one stream. The downside of this Synchrun sharing is that unrelated data will be mixed in the same Synchrun, diminishing the positive effects stream locality. We do not expect the number of concurrently written streams to be excessive in practice and thus do not intend to optimize for this case.

(Concurrent Writes of Duplicate Blocks)

If multiple Access Nodes attempt to write the same block concurrently, multiple copies of the same block could be stored. Global Block Index leases are used to prevent this from happening in practice.

The lease is always taken before a new block is written—it can be acquired automatically when a Global Block Index query returns no candidates, or explicitly when all candidates are rejected. A lease contains the hash of the block being written and an address of the Access Node writing this block.

If an active lease on the requested hash is found during a Global Block Index query, a notification that another Access Node is writing the same block concurrently is returned. The subsequent writers will then contact the original Access Node and wait until the original block write is finished.

Leases are released when a translation for the same hash is inserted into the GBI, when the write operation fails (e.g. due to out of space) or after some timeout (e.g. in case of Access Node failure). Leases are only granted by a selected Component in the Index FPN Supernode responsible for the block's hash. The leases will also not be granted if that Component has not heard from the quorum in its Supernode for some time. This limits the possibility of duplicate blocks being stored concurrently to short windows of time when the Index FPN Component is failed over or partitioned from the network.

(Reads)

A block can be read either based on its hash key or its Unique Block Id, depending on what type of address is kept in Pointer Blocks (this will be discussed in detail below). The block can be reconstructed by reading sufficiently many fragments. To actually read the data, the fragments' offsets in SCCs need to be looked up first.

Reading by hash requires an extra step to look up the Unique Block Id. It can be done just like deduplication, by consulting the Translation Cache and Global Block Index.

The Translation Cache on Access Node is used to find the SCC offsets. If the Unique Block Id is found in the cache, the associated entry already contains the data offset. This offset may be stale, so it is verified on the Storage Node when the fragment read request is processed. If there was no entry for the fragment in the Translation Cache, the fragment read request is forwarded to the Storage Node which hosts the fragment's synchrun.

The Storage Node can use the offset found in Translation Cache to read the data directly. If the offset is not known or invalid, the SCC Index entry has to be read. In common cases, this only has to be done on one of the Components, because fragments of the same block are usually stored at the same offset in all $SNC_{Data}$ SCCs.

As in duplicate elimination, Indexes of SCCs which contained sufficiently many fragments are downloaded to the Translation Cache to speed up future reads.

Only original fragments need to be read to reconstruct a block. The original fragments are preferred, because reconstructing the original data from them does not require erasure decoding. However, it can be beneficial to read some redundant fragments instead, to spread read requests more evenly among disks.

(Failure Recovery)

Failures of Index and Storage Nodes are detected by the appropriate FPN layer. FPN Components hosted on a failed Node are recreated (using consensus) on different Index/Storage Nodes. The nodes are selected to maintain good balancing of the number of Components per node.

When the location of a Component changes, all data associated with this Component (respectively Synchruns or Global Block Index entries) are either transferred from the previous location, or reconstructed from peer Components. This reconstruction process goes on in the background.

In the Index FPN, the Global Block Index translations are replicated and can simply be copied. In the Data FPN, SCCs are reconstructed by reading the remaining fragments, reconstructing the original blocks, re-encoding the missing fragments and writing the missing SCCs at the new Component's location.

Due to the load balancing, recovered Components will typically be spread out over many nodes. Data reconstruction will thus write to multiple nodes in parallel, yielding high rebuilding performance and restoring the intended resiliency level quickly.

(Deletion and Space Reclamation)

Deletion of blocks is done using a distributed garbage collection process. The same overall algorithm described in NPL 1 can be adapted to this system.

Distributed Garbage Collection

In summary, a reference counter is maintained for each block, in the SCC Index. The reference counter of a block is the number of Pointer Blocks referencing the block.

The counter values are only changed by a periodic Garbage Collection process. The Garbage Collection runs in phases, synchronized globally using the Global State mechanism.

In the first phase, all new Pointer Blocks written since the last Garbage Collection are processed and counter incrementation requests are sent to Storage Nodes hosting the pointed blocks. When all blocks are processed, the reference counter updates are sorted by the Unique Block Id and applied in batch to all blocks in a given SCC. Then, Pointer Blocks with a reference counter of 0 are identified. Since these blocks are about to be removed, counter decrement requests are sent to all blocks pointed by them. The reference counters updates are applied again, and if more Pointer Blocks were removed, another decrementation phase is started.

The division into phases, called Epochs, simplifies synchronization of Global Block Index updates with block writes—a block can never be removed in the same epoch in which it was written, and advancing to the next Epoch requires all pending Global Block Index updates to complete.

Space Reclamation

The Garbage Collection process only marks blocks as dead—their translations are removed from the Global Block Index, and new duplicates can not be eliminated against them, but their storage is not released yet. The space is reclaimed in the background, one SCC at a time.

Space reclamation will decrease the average size of a Synchrun. To prevent the amount of per-SCC metadata from growing indefinitely, consecutive SCCs will be concatenated to maintain the average SCC size within bounds.

Only SCCs with consecutive Synchruns can be concatenated. Priority is given to concatenation of Synchruns from the same Streamrun—Synchruns from different Streamruns can only be placed into one SCC if there is no other SCC with data from that Streamrun.

(System Growth)

When new Storage Nodes are added to the system and its capacity increases, the number of FPN Supernodes has to increase to maintain good load balancing. This is done by increasing the length of the zone prefix—each FPN Component is split into two new Components with a longer prefix.

The Global Block Index entries are split between the new Components based on the hash key.

Synchruns are also split between the new Supernodes. This is done by extending the number of bits of the Synchrun Identifier interpreted as the zone prefix, with the least significant bit of the Streamrun Id moved to the zone prefix. For example, Synchruns with ids (prefix:streamrun:sequenceNumber) 01:0:0, 01:1:0, 01:2:0, 01:3:0, 01:4:0 and 01:5:0 are equivalent to 010:0:0, 011:0:0, 010:1:0, 011:1:0, 010:2:0 and 011:2:0 after the split.

In result, when the system grows, synchruns are equally distributed between the new Supernodes, at the granularity of Streamruns.

If Synchruns belonging to different Supernodes after a split were concatenated to a single SCC, the SCC will be split up by background operations. However, this happens rarely, because priority is given to intra-Streamrun concatenations before the inter-Streamrun concatenations.

Components (and thus data) are always rebalanced onto newly added nodes in order to provide high instantaneous write bandwidth.

(Data Organization Discussion and Evaluation)

(Impact of Streamrun Size)

The size of a Streamrun determines how often a new supernode will be selected for a stream of data. There is a tradeoff associated with the choice of Streamrun size. Switching to a new supernode often (e.g. after every synchrun) is good for load balancing, but:

causes data to be scattered between supernodes after system grows prevents disks spin-down.

The right balance between switching after every synchrun and switching only after the supernode is full needs to be found.

(Capacity Balancing)

Supernode Components are used to balance capacity utilization in the system. Components are assigned to Storage Nodes in proportion to the amount of storage capacity present on that Storage Node. Since whole Components are always transferred, multiple of them are present on each Storage Node to make the balancing less granular.

Balancing on the level of Supernode Components results in a balanced capacity utilization if all Supernodes have roughly the same size. Uniformly random allocation of Streamruns to Supernodes prevents any significant imbalance of Supernode sizes from forming. The Supernodes remain balanced even if correlations were present in the input data and in the face of deletions.

Compared to systems which distribute blocks by hash, the allocation unit is relatively large—entire Streamruns are allocated in the proposed system, which are at least 3 orders of magnitude larger than blocks. If the Streamruns were too large, the maximum utilization of the system would suffer if simple uniform allocation to Supernodes was used. An experiment was done to evaluate how the choice of allocation unit size impacts the maximum utilization achievable by random allocations. A Streamrun is allocated to a randomly selected Supernode until a full Supernode is encountered. The experiment assumes a 48 TB system, with each Supernode 1.5 TB in size.

For Streamrun size of 64 MB, the imbalance between Supernodes is 2% on average. With a strict uniformly random allocation policy, the system would become full when 98% of its capacity is written. This can be improved by attempting allocation in a different Supernode if the originally selected Supernode is out of space. This allows new writes to reach almost 100% utilization, while data deletions will still not cause significant imbalance on average.

(Redundancy and Parallelism)

The Supernode Cardinality of the Data FPN determines:

redundancy of the Data FPN—less than half of active FPN Components can fail permanently; otherwise, consensus quorum is lost the number of available data resilience classes—erasure-coding can be configured to produce from 0 up to $SNC_{Data}-1$ redundant fragments the amount of parallelism assigned to a single stream.

Each block write requires $SNC_{Data}$ fragments to be written, and block reads require at least the original fragments of the block to be read. Therefore, a single data stream is actually striped onto $SNC_{Data}$ Storage Nodes. This striping improves per-stream throughput, by parallelizing data accesses over up to $SNC_{Data}$ storage disks. $SNC_{Data}$ can be increased to configure the system for higher single-stream throughput. However, excessively high $SNC_{Data}$ will degrade the stream locality and random-read performance, as many disks have to be accessed to read a single block.

The standard Supernode Cardinality value of is 12, which should provide sufficient parallelism to saturate the throughput of a single client, while maintaining good stream locality and random read performance.

The Supernode Cardinality of Index FPN can be lower, as the Global Block Index translations are replicated, not erasure-coded. Parallelism is inherently provided by the hash-based load distribution. Therefore, only network survivability and availability need to be consider in this case.

(Block Addresses in Pointer Blocks)

Pointer Blocks are blocks which refer to other, previously stored blocks. They can be used to link individual data blocks into data structures like files or entire filesystem snapshots.

Each block stored in the system can be accessed either by a content-derived HashAddress or by a location-dependent UniqueBlockAddress. Either of these addresses could in principle be stored in Pointer Blocks. The choice of the type of pointer comes with several tradeoffs. These tradeoffs are summarized in FIG. 1.

Address Size

A HashAddress is a hash of the contents of the block concatenated with some metadata (e.g. resilience class). The address has to be large enough to make the probability of hash collisions negligible in systems of the expected size. Assuming the SHA-1 hash function is used, the HashAddress is 20 bytes in size.

A UniqueBlockAddress is the (SynchrunId, blocksequencenumber) pair which uniquely identifies a block in the system. This address can be made much smaller than the hash—since Synchrun Ids are assigned systematically, there is no possibility of collisions. The number of bits required to uniquely identify a block is dependent on the number of non-duplicate blocks written to the system throughout its lifetime. Even assuming a tiny 1K block size and $2^{16}$ blocks per Synchrun, the 64-bit Synchrun Identifier space would not be exhausted until $2^{40}$ petabytes of non-duplicate data was written to the system.

Read Performance

The location of a block has to be looked up before its data can be read. If blocks are read sequentially, in the same order in which they were initially written, most of these lookups will be handled by the Translation Cache without any disk access. However, the Translation Cache may not contain translations for the first several blocks of a stream (until the stream's SccIndex is prefetched), and the cache is not effective at all for random reads. In these cases, an expensive fragment location lookup has to be done.

If pointer blocks were HashAddresses, this lookup would have to go through the Global Block Index, incurring a disk seek. This is not necessary for UniqueBlockAddresses, since the required SynchrunId is contained within the address.

Block Relocations

When a static Synchrun-to-Supernode mapping is used, it may be useful to move a block to a different Synchrun in some cases. It can be necessary to improve load balancing in non-symmetric networks.

If HashAddresses were used in Pointer Blocks, a block's Synchrun could change without changing the contents of Pointer Blocks pointing to it. If, on the other hand, UniqueBlockAddresses were used, all Pointer Blocks pointing to a relocated block would have to be updated. The updates would have to be propagated all the way up to block tree roots, since addresses stored in a Pointer Block are included in the calculation of the Pointer Block's hash.

Requirements on Hash Lookup

Reading a block by its HashAddress depends on its translation being present in the Global Block Index. If this was the only way to read a block, the system would have to guarantee that the GBI was successfully updated before a Block Write operation could complete. This would increase latency of Block Write operations, or require Hash Leases to be persistent.

System Healing

If the system experiences more failures than it was configured to withstand, some blocks can become unreadable. Due to deduplication, all filesystem snapshots containing the unreadable block will be affected.

In many cases, the lost data is still present in the original system and will be written to the system with the next backup. The block will be stored again in a new Synchrun, but with the same HashAddress.

If PointerBlocks contained HashAddresses instead of UniqueBlockAddresses, this new block could be used also when reading the old filesystems, originally pointing to the unreadable block. Effectively, rewriting the lost blocks would automatically "heal" the system.

Pointer Blocks with Hints

It is possible to combine the benefits of HashAddresses (block relocations, system healing) with those of UniqueBlockAddresses (better random read performance, looser requirements on hash lookups) by keeping both addresses for each pointer in PointerBlocks. The HashAddress would be authoritative and only it would influence the hash of the Pointer Block. The UniqueBlockAddress would be a hint used for avoiding Global Block Index updates if the hint is up-to-date. The hint could become stale (when the pointed block changes location or becomes unreadable), and the hint could be updated lazily in these cases. The downside of this approach is that it requires the most storage capacity for Pointer Blocks.

(Performance of Unique Block Writes)

As mentioned above, backup systems are more often written than read and high write throughput is essential for the feasibility of the system.

In the architecture proposed in the present invention, every stream of unique data is striped across $SNC_{Data}$ disks when it is initially written. On the other hand, in systems doing hash-based distribution of blocks the writes are spread uniformly over all disks. Therefore, the system proposed in the present invention provides significantly lower single-stream write throughput. However, as noted above, a single client system cannot typically take advantage of such high throughput anyway, so we find this limitation insignificant.

Load Balancing

In large systems, multiple streams will typically be written concurrently. Synchruns will be allocated for each of the streams randomly and independently. Therefore, the same Supernode can be selected to host multiple Synchruns, forcing several streams to share the throughput of a single Storage Node.

This load imbalance can be mitigated by using multiple random choices in the Synchrun allocation algorithm. When choosing a new Supernode, queries are sent to d randomly selected Supernodes, and the Supernode with the lowest number of actively written Streamruns is selected. Using multiple random choices was shown to improve randomized load balancing significantly.

Figure 3:
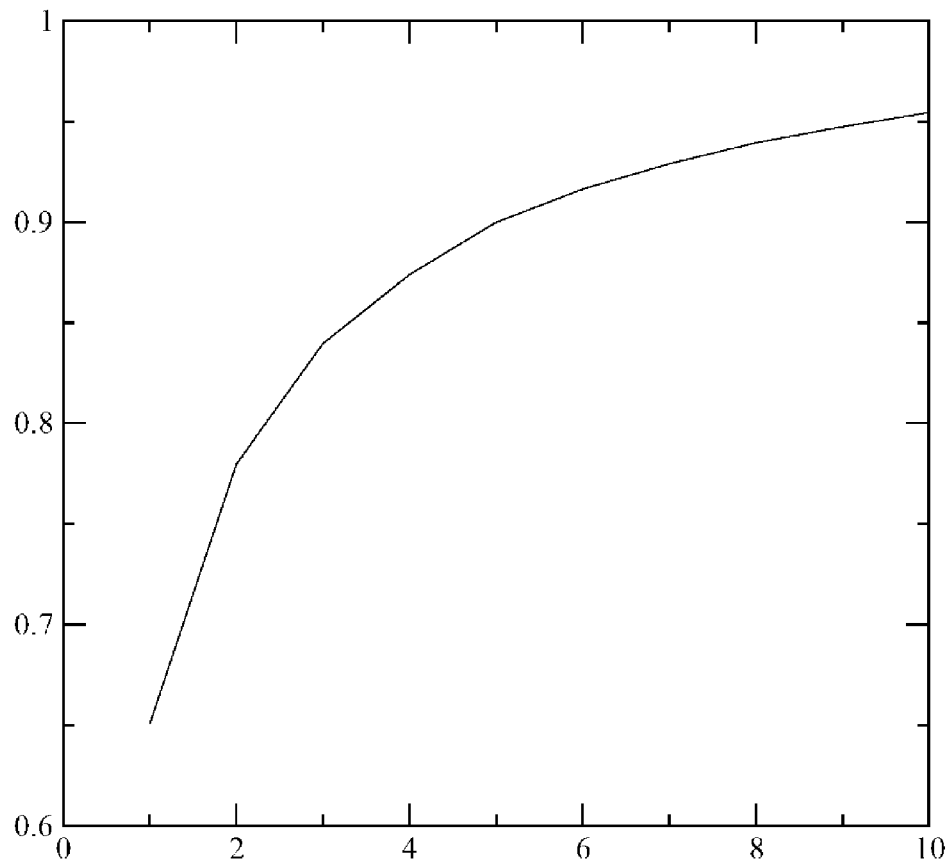
FIG. 3 is a chart showing an effect of load due to system size enlargement on the write bandwidth in the first exemplary embodiment.

FIGS. 2 and 3 show how the load imbalance impacts write bandwidth with increasing system size. Allocation of n Streamruns to n Supernodes was simulated, for varying numbers of Supernodes and allocation queries. Note that the number of Supernodes is always proportional to the system size.

FIG. 2 displays an average of the maximum number of Streamruns allocated to a single Supernode. As expected, using just one additional allocation query significantly decreases the maximum number of Streamruns in a Supernode. However, even with many queries, a Supernode with more than one active Streamrun can be found with high probability. The streams whose Stream-runs were allocated to such a Supernode will experience degraded write throughput until the Streamrun is exhausted and another one is allocated.

However, FIG. 3 shows that the effect of this load imbalance on aggregate write bandwidth is not large, even though individual streams may experience some slowdown. The write bandwidth was computed by counting the number of Supernodes which had at least one Streamrun assigned to them (an underlying assumption was that a single stream is sufficient to saturate the throughput of one Supernode). With 10 queries, the bandwidth achieved was within 5% of maximum, even for very large systems.

Stream Sorting

In systems doing hash-based distribution, writes belonging to different streams are multiplexed in the same storage containers. Since it is unlikely that the same streams will be read together, reads of such multiplexed containers are inefficient because they have to skip over unnecessary data. Stream Sorting is used in NPL 1 to improve future reads by coalescing data from a stream into larger chunks. However, Stream Sorting either increases latency, if it is done inline during the writing process, or requires rewriting all data in stream-sorted order by a background process.

The architecture proposed in the present invention avoids multiplexing data from different streams altogether, because a separate Streamrun is created for each stream.

(Read Throughput)

The main motivation for the proposed architecture is improving read throughput in large systems by preserving more stream locality.

(Stream Locality Preservation)

Stream locality degrades naturally in storage systems doing exact deduplication. Since the focus of this paper is extra degradation caused by the internal data organization of the storage system, we will factor out the effect of deduplication by analyzing how locality is preserved for streams of unique data blocks.

Initially, Synchrun-sized portions of the input stream are placed sequentially on disk. The expected size of a Synchrun is in the range of several to tenths of megabytes, so sequential reads of the input stream will result in negligibly few seeks on the storage disks.

Deletions can remove blocks from the middle of Synchruns. Garbage Collection will then cause the size of a Synchrun to shrink. Before the Synchrun size drops significantly enough to affect sequential read performance, consecutive Synchruns will be concatenated as described above. Concatenations will preserve locality of the data up to the size of a Streamrun. If so many blocks were removed from a Streamrun-sized portion of the data stream that only half of a Synchrun remain, concatenations will begin merging Synchruns belonging to a different stream, and will no longer be effective for preservation of the original stream's locality.

On system growth, existing data is transferred to the new nodes to keep capacity utilization balanced. However, as noted above, Streamruns are always kept together as a unit. Therefore stream locality is not affected by the addition of new Storage Nodes.

(Comparison with Hash-Based Block Distribution)

The read throughput in both hash-based block distribution and the per-stream block distribution proposed in the present invention depends significantly on the access pattern, both during writing and reading. To make the tradeoffs between the two architectures more visible, we will analyze how these systems function in some typical scenarios.

Single Stream Written, Single Stream Read

The simplest scenario, though rather unlikely in large systems, is sequentially reading a data stream, at the time it was originally stored, was the only stream being written. In this case, hash-based distribution is very efficient, providing the combined throughput of all Storage Nodes. The architecture proposed in the present invention performs sufficiently well, with parallelism of $SNC_{Data}$ Storage Nodes, which is supposed to be sufficient to saturate a single client.

Multiple Streams Written, Single Stream Read

A situation when many streams are written concurrently and only one of them is read back later is arguably quite typical in practical systems. It can easily arise when multiple systems are backed up in parallel during shared backup windows, and then only one of the systems suffers failure and is recovered from backup.

This situation is less favorable for systems using hash-based distribution. Since blocks belonging to all streams are uniformly distributed to the same on-disk containers, reading back only one stream would require either seeking or skipping over the other blocks. NPL 1 attempts to solve this problem by sorting blocks in the containers according to the Stream Id, both in the background and inline during writing, when blocks await for submission in the write buffers. The effectiveness of such Stream Sorting is limited by the Container size.

The architecture proposed in the present invention is not affected by this problem because writes from different data streams are stored in independent containers. The read throughput in this case is still the combined throughput of $SNC_{Data}$ Storage Nodes.

Multiple Streams Read

Multiple streams can be read back concurrently if many backup images are restored in parallel after a massive failure of many backed up systems. However, even a single external read stream can look like multiple stream reads to the system when a highly fragmented deduplicated stream is read.

In systems with hash-based distribution, all Storage Nodes effectively store a scaled-down version of each stream. Each of these scaled-down streams has to be read in parallel to recreate the whole stream. Every Storage Node has to service accesses from each of the streams being read in the system. Since both the Storage Nodes and Access Nodes have a fixed amount of memory for buffering the reads, smaller disk read sizes have to be used with increasing number of concurrent read streams. Using small disk reads significantly decreases the throughput, finally degenerating the sequential reads into random block reads.

The proposed system does not suffer from the same problem, because each data stream is striped over only a small set of Storage Nodes. However, unlike the hash-based distribution, it suffers from imperfect load balancing—it is possible for many streams to be read from a small set of Storage Nodes, while other Storage Nodes are idle. Reading redundant fragments in exchange for some original fragments can improve load balancing at the cost of higher CPU consumption by the erasure-coding algorithm. Nevertheless, for a large number of simultaneous read streams, the read performance is significantly higher than when using hash-based block distribution.

(Global Block Index Updates)

As described above, the Global Block Index maps a Hash to the block's UniqueBlockAddress (Synchrun Id and sequence number within the synchrun). Because of this decision, Global Block Index translations do not have to change when data location changes or garbage collection is done—the block address remains valid until the block is removed.

An alternative solution would be to keep the SCC Id and the block's offset within that SCC. This could potentially improve random read performance by avoiding the (SynchrunId, sequencenumber) to (SCCId, Offset) translation. However, it would require updating the GBI translation after any background operations which change offsets of fragments in SCCs (space reclamation, concatenation) and would thus increase load on Index Nodes.

(Support for Non-Symmetric Networks)

Hash-based distribution spreads blocks of a data stream uniformly over all Storage Nodes. Therefore, Access Nodes have to transmit identical amounts of data to each Storage Node. The bandwidth of writing a data stream will be limited by the throughput of the slowest network link between the Access Node and Storage Nodes.

In the architecture proposed in the present invention, Access Nodes have more freedom in choosing the Supernode, and thus the Storage Nodes, on which they store the data. This can be used to improve write performance in non-symmetric networks.

As described above, it is assumed in the present invention that the network is composed of groups of nodes. Nodes within a group can communicate with high point-to-point throughput, while links between groups provide lower per-node throughput.

Access Nodes will attempt to allocate Streamruns only on Storage Nodes in their own group to avoid using the inter-group links for writes. Since Streamruns are allocated to Supernodes and not directly to Storage Nodes, the Data FPN key space is partitioned such that a range of prefixes in the Data FPN corresponds to one group of nodes. If a Supernode is assigned to a group of nodes, all of its Components are kept on Storage Nodes belonging to that group.

The Streamrun allocation algorithm is modified to only consider Supernodes in the same group as the Access Node. Only if the selected Supernode is full, a regular allocation, unconstrained by node group, is performed.

This group-local allocation policy eliminates the most bandwidth-intensive data transfers across slower links. Unless the capacity of the group system is exhausted, block writes are only handled by Storage Nodes in the same group as the Access Node. GBI queries are still sent to all Index Nodes uniformly, but they don't consume significant bandwidth. Similarly, SccIndex prefetches done by Translation Cache when writing duplicate blocks can use some inter-group bandwidth if the duplicates are stored in a different group. However, since the SccIndexes are small compared to the size of data, they should not exceed the inter-group throughput. Data reconstruction after failures also does not require much inter-group bandwidth, since all Supernode Components are in the same group.

However, this policy comes with some tradeoffs. Capacity balancing is only done within a single node group—if some clients write more data than others, free space in their groups will be exhausted faster than in other groups. Redundancy of the system may be decreased if failures of Storage Nodes in the same group are not independent, because all Components of a Supernode are placed in the same node group.

While new writes do not generate cross-group network traffic, the effect on reads depends on the deduplication pattern. For example, when an Access Nodes writes data which was already written by an Access Node connected to a different group, the data is stored in the original group only. Reading the data from the second Access Node will have to transfer all of the data from the original group. In this case, the read performance can even be worse than if the data was spread uniformly over all Supernodes.

It is argued in the present invention that despite the lower read throughput in the worst case, deploying a non-symmetric network can make sense when taking the lower cost of such networks into account. First, if the same client system is consistently backed up through Access Nodes in one network group, any unique data present only on that system will likely be stored in that group. This data will be readable with high throughput. Second, a restore of a failed client system typically involve reading only several backup images. If few streams are read simultaneously, the inter group links should be sufficiently fast not to be a bottleneck, even if the data is stored on other node groups. And finally, reading data from a remote node group does not have to compete for inter-group network throughput with simultaneous writes.

(Latency and Resiliency to Marauders)

The proposed architecture can introduce more latency for block writes than hash-based distribution, because of the extra network hop required for querying the Global Block Index. Also, it can potentially have higher write latency for multiple relatively slow clients—more time is necessary to accumulate a large buffer for sequential writes. This is a consequence of not mixing blocks from different streams. In systems doing uniform hash-based distribution, blocks from all streams can be accumulated in the same write buffers and flushed to disk sequentially.

On the other hand, any inline Stream Sorting necessary in hash-based distribution systems, which can significantly increase write latency, is not necessary in this system.

The proposed architecture is also more resilient to marauders—nodes which work fast enough not to be declared failed, but which operate more slowly that the other nodes. In this architecture, only the streams accessing a particular node are affected by that node's slowness or failures. With hash-based distribution, the performance of the whole system is determined by the slowest node in the network.

Because only several Storage Nodes are servicing write requests on behalf of a single stream, it is possible to request an explicit flush of outstanding data in stream to decrease latency. This is useful e.g. when handling NFS sync requests in some clients, which often block further operations until all previously submitted data is written. The Access Node can request an explicit high-priority flush because writes are only sent to one Synchrun at a time by one stream. This is infeasible in hash-based distribution systems because a request to all Storage Nodes would have to be sent.

(Static vs Dynamic Assignment of Synchruns to Supernodes)

In the solution presented in the present invention, Synchruns are statically assigned to Supernodes. The assignment is based solely on the SynchrunId and cannot change without changing the Synchrun's Id.

A dynamic mapping of Synchruns to Supernodes could be considered, where the Storage Node on which a Synchrun's data is stored has to be looked up and is not statically determined by the Synchrun Id. The advantage of such dynamic mapping is that individual Supernodes could change location to adapt to changes in the system. For example, in a non-symmetric network, Synchruns could be moved closer to Access Nodes accessing them most frequently.

The present invention decided against the additional mapping in the proposed system, because it would introduce an extra network hop for the Synchrun-to-StorageNode lookup, increasing the latency of reads.

(Conclusion)

The present invention introduced a new architecture for efficient scalable high-performance inline deduplication which separates the DHT-based global block index used for exact deduplication from the stream-aware, sequential data placement.

The above description has shown that, compared to existing solutions, the architecture proposed in the present invention improves read performance in large systems, when the number of concurrent read streams grows with the system size. The system preserves stream locality even in the face of data deletions and node additions, while maintaining good capacity balancing between Storage Nodes. It also avoids interleaving blocks from different stream when multiple streams are written concurrently.

In symmetric networks, hash-based distribution provides slightly higher write throughput, though at a significant cost in read performance. The architecture proposed in the present invention provides significantly higher write performance in non-symmetric networks, even in the presence of simultaneous reads, though read performance is highly dependent on the access pattern.

Existing systems doing hash-based block distribution can be more efficient in small to medium systems because they avoid issues with load balancing and hot spots. However, we find that the architecture proposed in the present invention is better suited to large installations when high multi-stream read throughput is required.

Second Exemplary Embodiment

Figure 4:
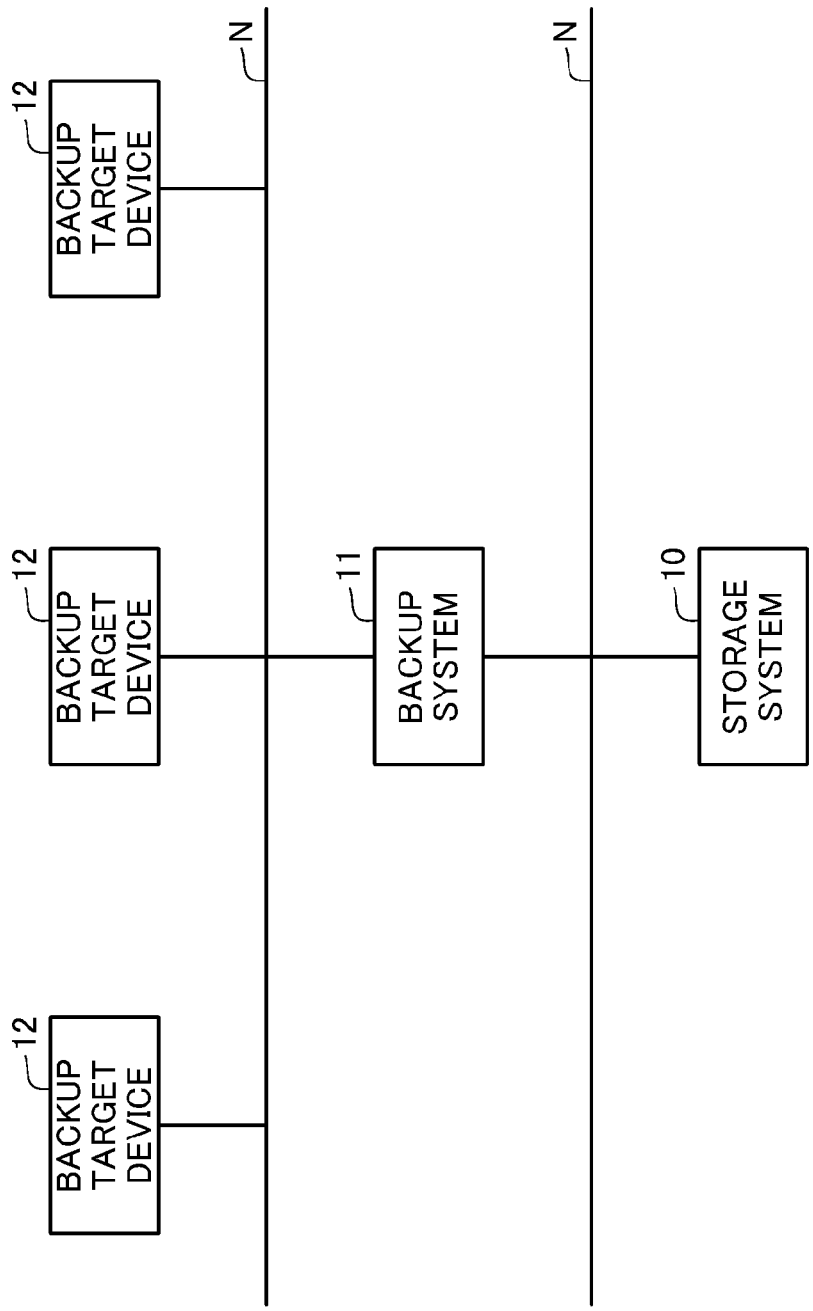
FIG. 4 is a block diagram showing the configuration of the entire system including a storage system of a second exemplary embodiment.
Figure 5:
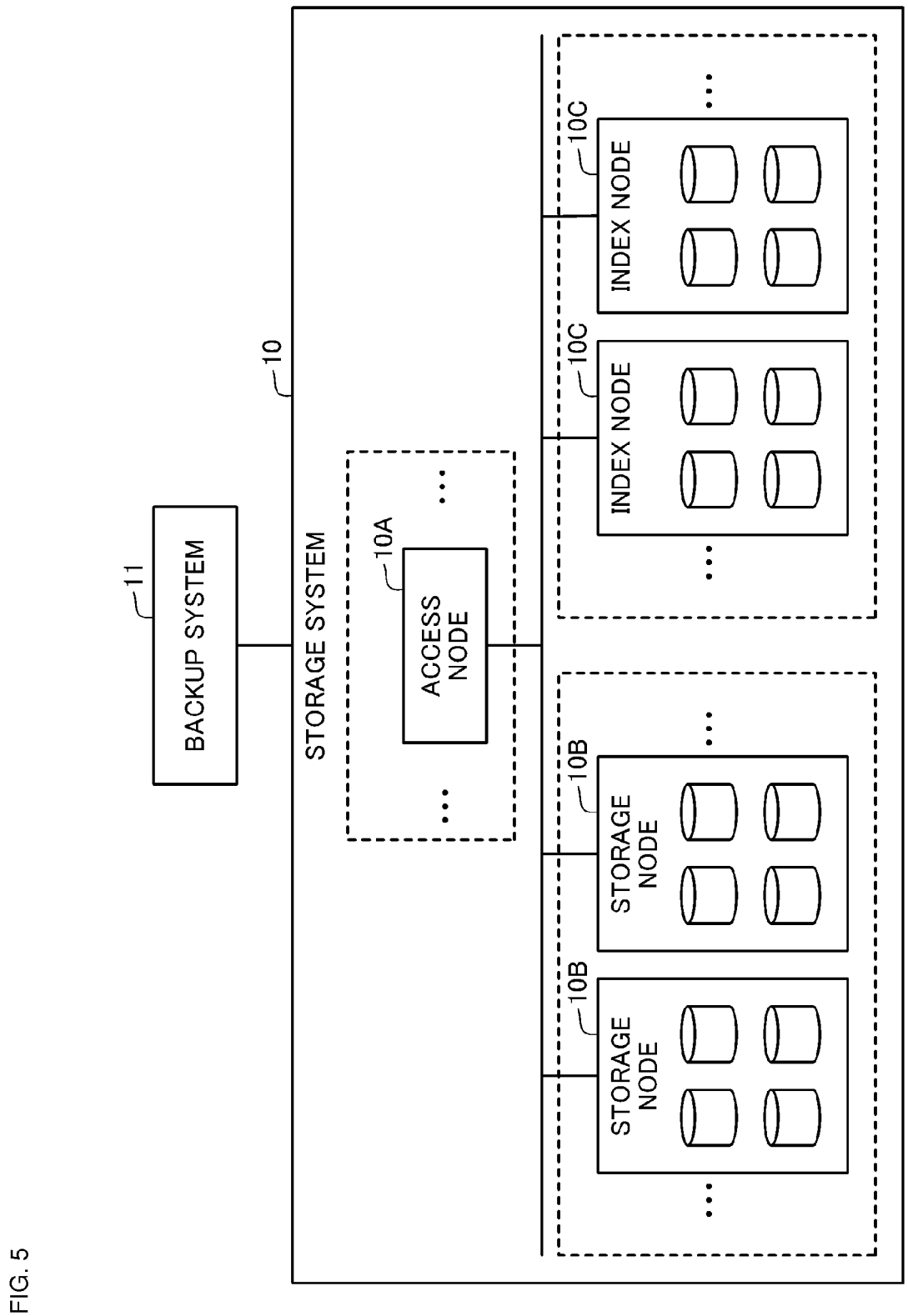
FIG. 5 is a block diagram schematically showing the configuration of the storage system of the second exemplary embodiment.
Figure 6:
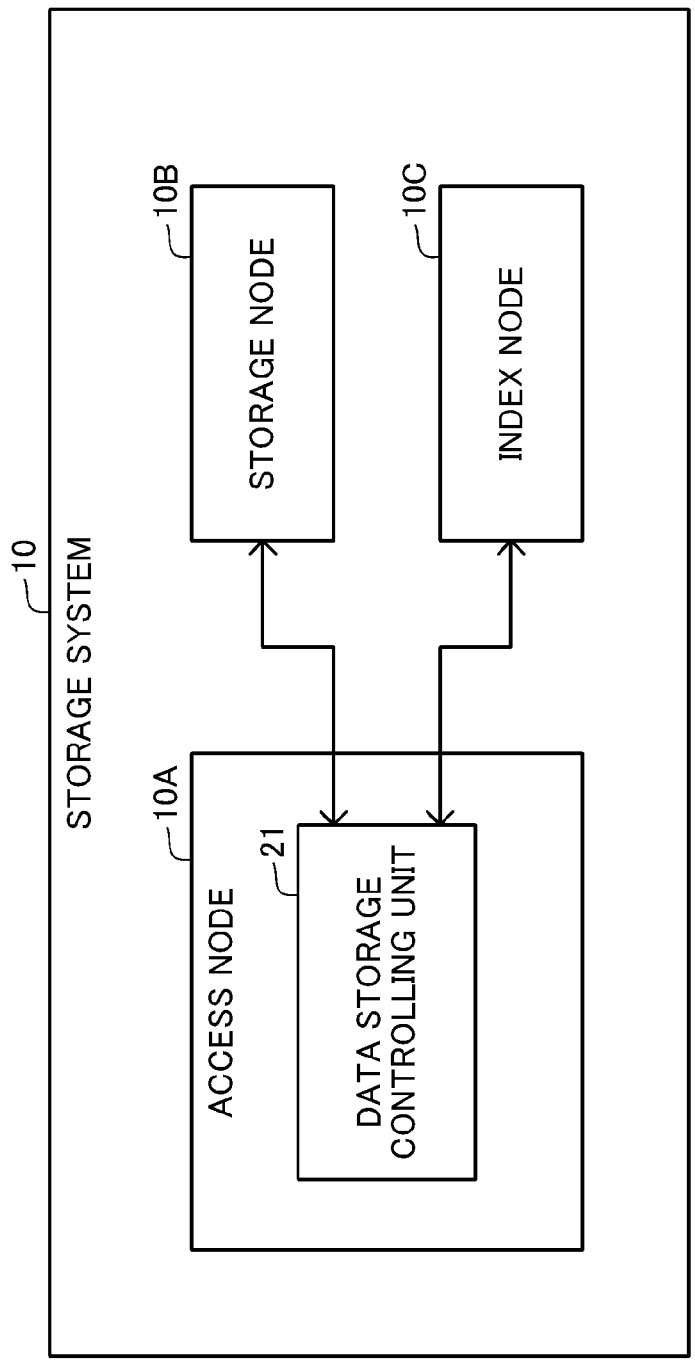
FIG. 6 is a function block diagram showing the configuration of an access node of the second exemplary embodiment.

A second exemplary embodiment of the present invention will be described with reference to FIGS. 4 to 10. FIG. 4 is a block diagram showing the configuration of the whole system. FIG. 5 is a block diagram schematically showing a storage system, and FIG. 6 is a function block diagram showing the configuration. FIGS. 7 to 10 are explanation views for explaining the operation of the storage system.

This exemplary embodiment herein shows a case that the storage system is a system such as HYDRAstor and is configured by connecting a plurality of server computers. However, the storage system of the present invention is not limited to the configuration with a plurality of computers, and may be configured by one computer.

As shown in FIG. 4, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup.

As shown in FIG. 5, the storage system 10 of this exemplary embodiment employs a configuration that a plurality of server computers are connected. To be specific, the storage system 10 is equipped with an access node 10A (first server) serving as a server computer that controls the storing/reproducing operation of the storage system 10, a storage node 10B (second server) serving as a server computer equipped with a storage device for storing data, and a storage node 10C (third server) that stores index data representing data storage destinations. The number of the access nodes 10A, the number of the storage nodes 10B, and the number of the storage nodes 10C are not limited to those shown in FIG. 5, and a configuration in which more nodes 10A, 10B, and 10C are connected may be employed.

Further, the storage system 10 of this exemplary embodiment has a function of dividing storage target data and storing them in a distributed manner in the storage nodes 10B which are storage devices. The storage system 10 also has a function of checking whether data of the same content has already been stored by using a unique hash value representing the feature of storage target data (block data), and for data which has been stored, eliminating duplicate storage by referring to the storing position of such data. The specific storing process will be described in detail below.

FIG. 6 shows a configuration of the storage system 10. As shown in this drawing, the access node 10A constituting the storage system 10 includes a data storage controlling unit 21 that controls reading and writing of data to be stored.

It should be noted that the data storage controlling unit 21 is configured by programs installed in arithmetic devices such as a CPU (Central Processing Unit) of the access node 10A shown in FIG. 5.

The abovementioned program is provided to the storage system 10, for example, in a state stored in a storage medium such as a CD-ROM. Alternatively, the program may be stored in a storage device of another server computer on the network and provided from the other server computer to the storage system 10 via the network.

Figure 7:
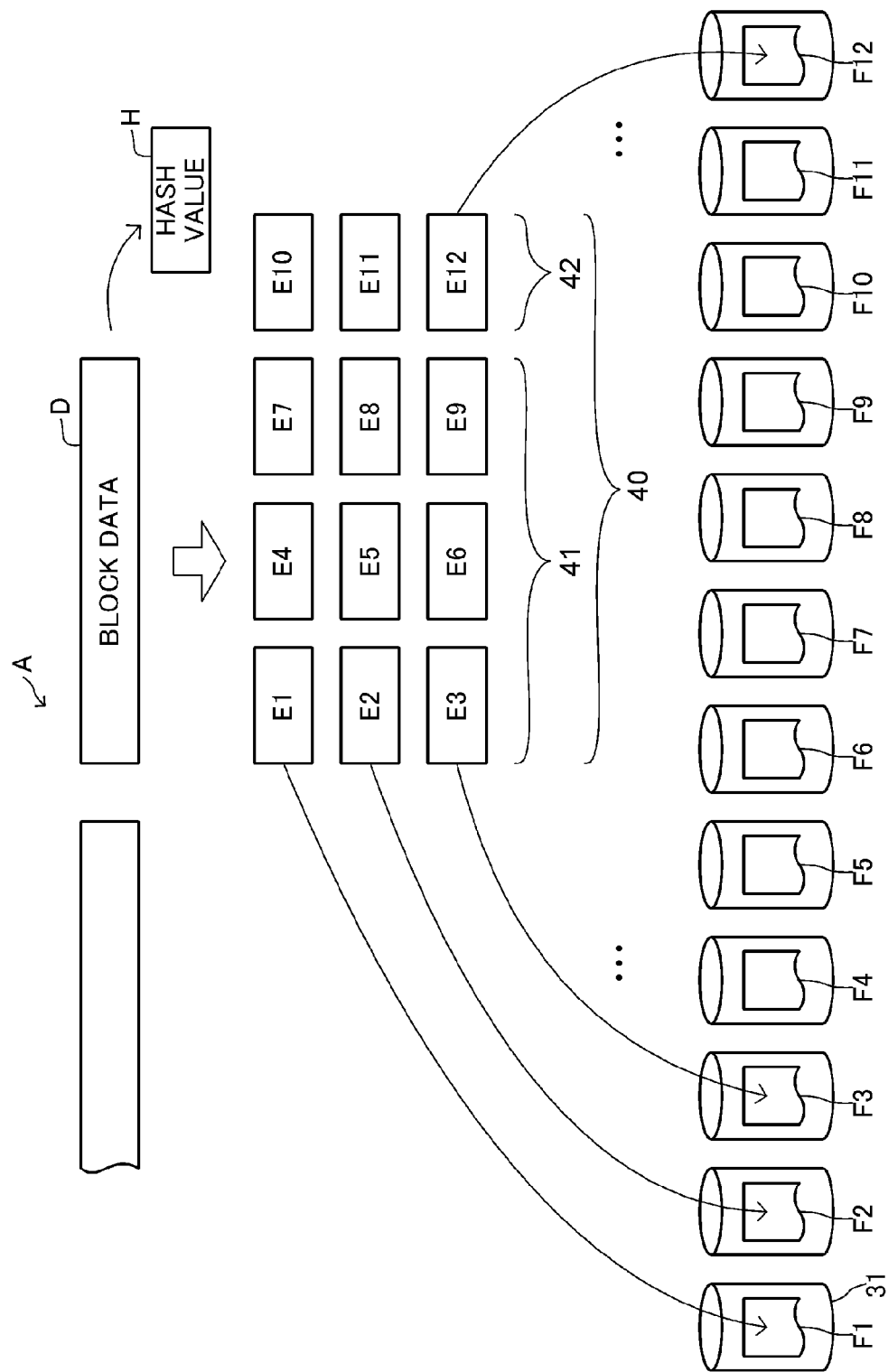
FIG. 7 is an explanation view for explaining an aspect of a data storage process in the storage system disclosed in FIG. 5.
Figure 8:
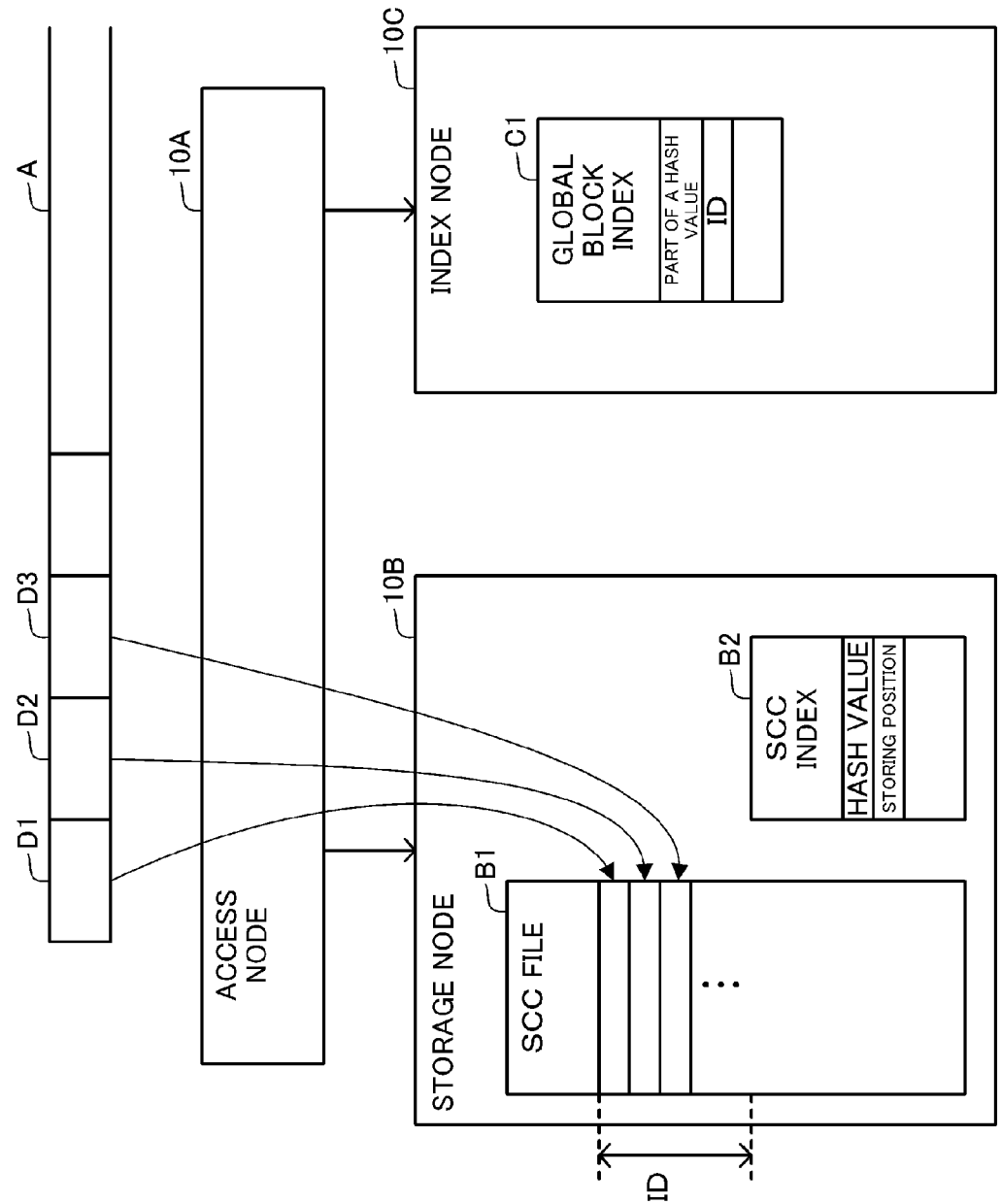
FIG. 8 is an explanation view for explaining the aspect of the data storage process in the storage system disclosed in FIG. 5.

Hereinafter, the configuration of the data storage controlling unit 21 will be described in detail. First, when the data storage controlling unit 21 receives an input of stream data which is backup target data A, the data storage controlling unit 21 divides the backup target data A into predetermined capacities (e.g., 64 KB) of block data D, as shown in FIG. 7. Then, based on the data content of this block data D, the data storage controlling unit 21 calculates a unique hash value H (feature data) representing the data content. For example, a hash value H is calculated from the data content of the block data D by using a preset hash function.

Then, the data storage controlling unit 21 performs duplication determination to determine whether or not block data D, to be newly stored, has been stored in the storage node 10B, that is, a storage device. At this moment, the data storage controlling unit 21 checks whether or not the hash value of the block data D exists in any of the SCC indexes B2, described below, which have been recently read in the access node 1A. If the hash value of the block data D does not exist in any of the SCC indexes B2, the data storage controlling unit 21 then checks whether or not the hash value of the block data D, to be newly stored, exists in a global block index C1 stored in the index node 10C. Further, in the case where the SCC index B2 has not been read in the access node 1A, the data storage controlling unit 21 also checks whether or not the hash value of the block data D, to be newly stored, exists in the global block index C1 stored in the index node 10C.

If the hash value of the block data D, to be newly stored, does not exist in the global block index C1 stored in the index node 10C, the data storage controlling unit 21 newly saves the block data of the stream data in the storage node 10B. An aspect that the data storage controlling unit 21 stores the block data D in the storage node 10B will be described specifically with reference to FIGS. 7 and 8.

The data storage controlling unit 21 sequentially stores block data D1 and the like, generated by dividing the data stream which is backup target data A, in an SCC file B1 formed in a particular storage node 10B. At this moment, the data storage controlling unit 21 determines a storage node 10B, in which the used storage capacity is the lowest or there is an open SCC file B1, to be the particular storage node 10B for storing the block data D1 and the like. It should be noted that the data storage controlling unit 21 may determine the storage node 10B for storing the block data D1 and the like by means of other methods.

Then, the data storage controlling unit 21 stores a plurality of continuous units of block data D1, D2, D3, and the like of the data stream to be stored, in the SCC file B1. At this moment, the data storage controlling unit 21 associates the storing positions of the respective units of block data D1, D2, D3 and the like in the SCC file B1 with the hash values H of the stored block data D1, D2, D3, and the like, and stores them as an SCC index B2 (storing position specifying table) in the storage node 10B storing the block data D1, D2, D3, and the like. Further, the data storage controlling unit 21 associates an ID (for example, an ID representing a specific region within the particular SCC file B1 (see FIG. 8)) which is identification information (storage device identification information) specifying the storage node 10B storing the block data D1, D2, and D3, with the hash values of the block data D1, D2, and D3, and stores them in the index node 10C as a global block index C1 (storage device specifying table). Herein, the data storage controlling unit 21 shall associate the ID specifying the storage node 10B not with the hash value but with part of the hash value and store them. At this moment, the data storage controlling unit 21 stores the global block index C1 in a distributed manner in the plurality of index nodes 10C. For storing the hash values and IDs in a distributed manner, any methods may be used.

As the data is stored as described above, a plurality of continuous units of block data D1, D2, D3, and the like of the backup target data A are continuously stored in the same storage node 10B, and units of data indicating their storing positions are also stored continuously in the SCC index B2. The storage node 10B (a specific region within a particular SCC file B1) storing the block data D1, D2, D3, and the like is managed by the global block index C1.

It should be noted that the storing process of the block data D1, D2, D3, and the like described above is actually performed such that a group of storage nodes 10B (supernodes) is used as a particular storage node 10B and the respective units of block data D1, D2, D3 and the like are stored in a distributed manner. Now, an aspect of storing block data by further dividing it will be described with reference to FIG. 7.

The data storage controlling unit 21 compresses block data D to be newly stored as described above, and divides the data into a plurality of pieces of fragment data having predetermined capacities as shown in FIG. 7. For example, as shown by reference numerals E1 to E9 in FIG. 7, the data storage controlling unit 21 divides the data into nine pieces of fragment data (division data 41). Moreover, the data storage controlling unit 21 generates redundant data so that the original block data can be restored even if some of the fragment data obtained by division are lost, and adds the redundant data to the fragment data 41 obtained by division. For example, as shown by reference numerals E10 to E12 in FIG. 7, the data storage controlling unit 21 adds three fragment data (redundant data 42). Thus, the data storage controlling unit 21 generates a data set 40 including twelve fragment data composed of the nine division data 41 and the three redundant data.

Then, the data storage controlling unit 21 distributes and stores, one by one, the fragment data composing the generated data set into storage regions 31 formed in the group of storage nodes 10B which are supernodes. For example, as shown in FIG. 7, in the case where the twelve fragment data E1 to E12 are generated, the data storage controlling unit 21 stores one of the fragment data E1 to E12 into one of data storage files F1 to F12 (data storage regions) formed in the twelve storage regions 31.

Figure 9:
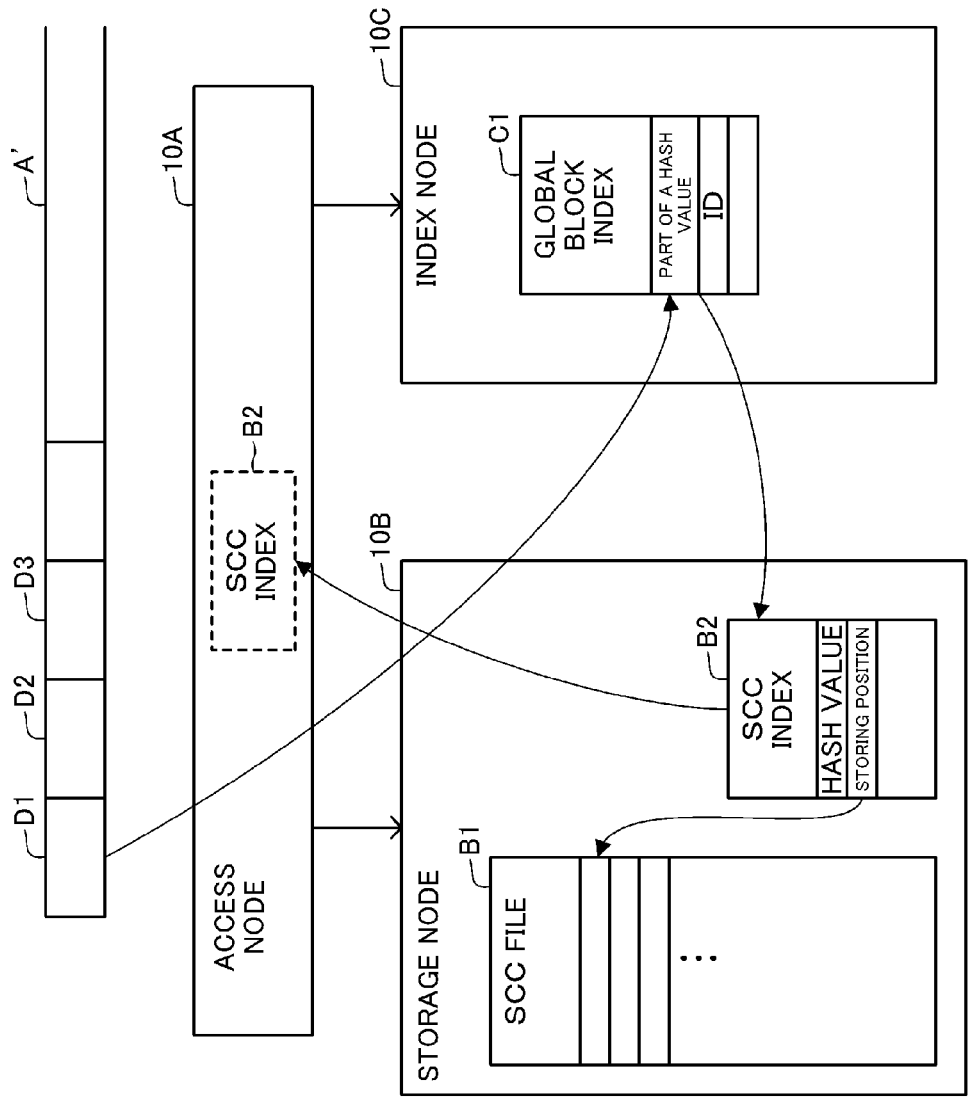
FIG. 9 is an explanation view for explaining an aspect of a data retrieval process in the storage system disclosed in FIG. 6.
Figure 10:
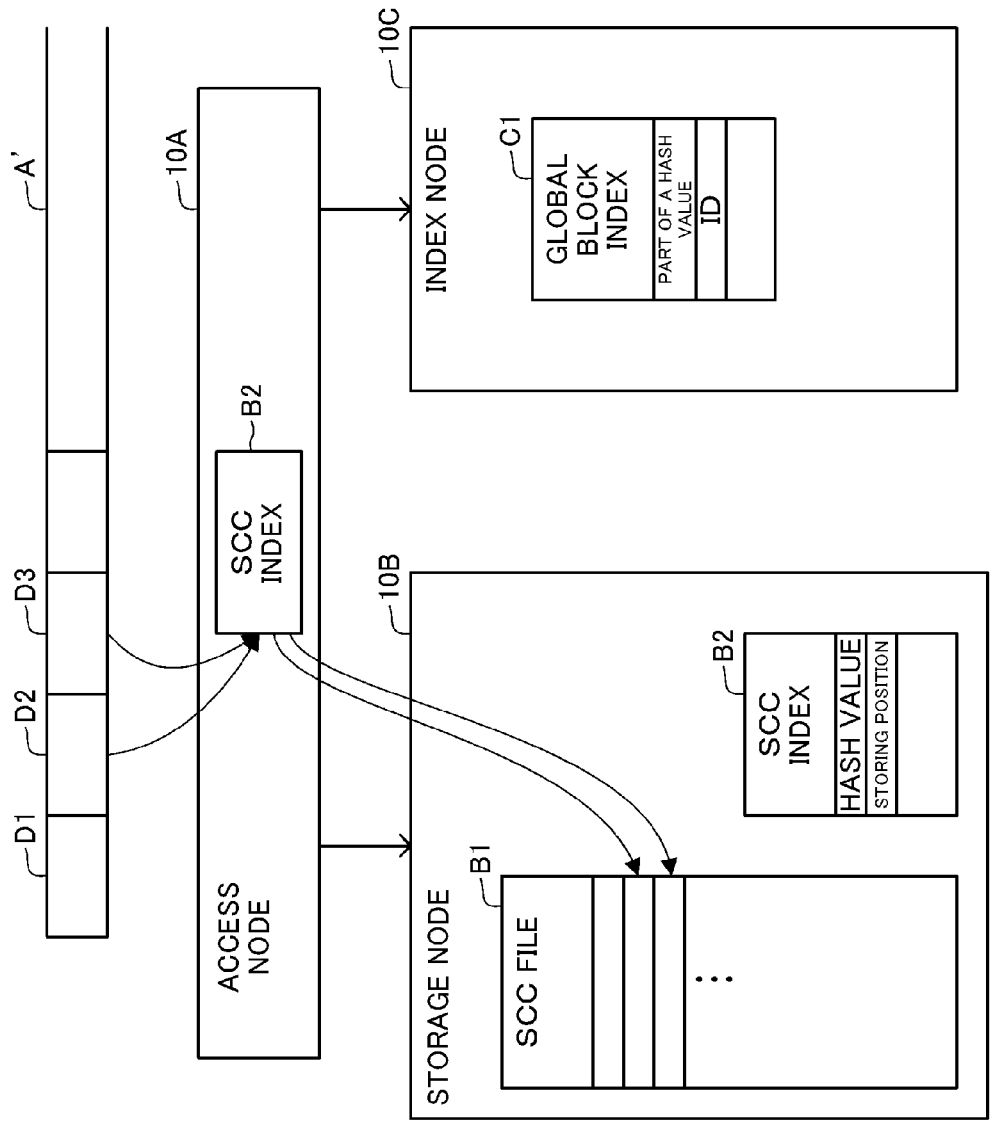
FIG. 10 is an explanation view for explaining the aspect of a data retrieval process in the storage system disclosed in FIG. 6.

Next, the case where a data stream of backup target data A', having an almost identical data content to that of the above-described data stream A, is input as new storage target data will be described with reference to FIGS. 9 and 10. First, the data storage controlling unit 21 performs duplication determination to determine whether or not block data D1 of the backup target data A' has already been stored in the storage node 10B which is a storage device. At this moment, the data storage controlling unit 21 checks whether or not the SCC index B2 has been read in the access node 1A. In this case, as the SCC index has not been read, the data storage controlling unit 21 checks whether or not a hash value (herein, part of a hash value) of the block data D1, to be newly stored, exists in the global block index C1 stored in the index node 10C.

If the hash value (part of a hash value) of the block data D1 to be newly stored exists in the global block index C1 stored in the index node 10C, the data storage controlling unit 21 specifies a storage node 10B (region of the particular SCC file B1) associated with the hash value (part of a hash value), and refers to the SCC index B2 in the storage node 10B. The data storage controlling unit 21 compares the hash value stored in the SCC index B2 with the hash value of the block data D1 to be newly stored, and if they match, refers to the SCC index B2 and refers to the storing position of the block data in the SCC file B1 as the block data D1 to be newly stored. Thereby, the block data D1 itself, which is to be newly stored, is not stored actually, and duplicate storage can be eliminated.

At the same time, the data storage controlling unit 21 reads out the SCC index B2 stored in the storage node 10B referred to as described above, to the access node 10A. Then, regarding the subsequent block data D2 and D3 of the backup target data A', the data storage controlling unit 21 compares the hash values of the block data D2 and D3 with the hash values stored in the SCC index B2 read out to the access node 10A, and if they match, refers to the SCC index B2 and refers to the storing positions of the block data in the SCC file B1 as the block data D2 and block data D3 to be newly stored. Thereby, the block data D2 and block data D3 themselves, which are to be newly stored, are not stored actually, and duplicate storage can be eliminated. Further, duplication determination can be performed at a higher speed.

As described above, the present invention includes a plurality of storage nodes 10B, and enables storage of data in a distributed manner so as to keep well-balanced capacities between the storage nodes. Further, according to the present invention, it is also possible to locally keep a predetermined amount of continuous units of block data, generated by dividing storage target data, in a particular group of index nodes 10B (supernodes). As such, a deduplication process can be performed at a higher speed, and further, a data reading process can also be performed at a higher speed.

<Supplementary Notes>

Figure 11:
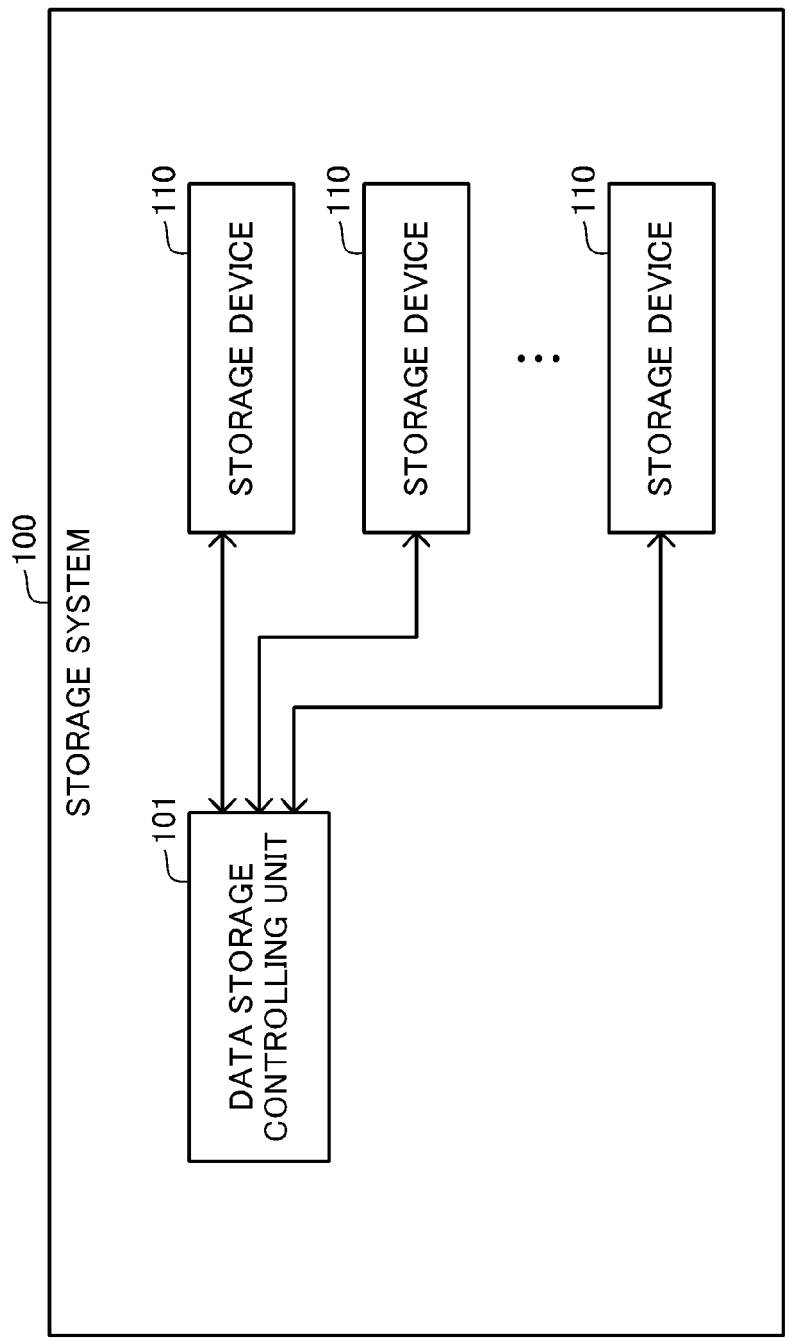
FIG. 11 is a block diagram showing the configuration of a storage system according to Supplementary Note 1.

The whole or part of the exemplary embodiments disclosed above can be described as the following supplementary notes. Outlines of the configurations of a storage system 100 the present invention (see FIG. 11), computer-readable medium storing a program, and a data storage method will be described below. However, the present invention is not limited to the configurations described below.

(Supplementary Note 1)

A storage system 100, comprising a data storage controlling unit 101 that stores a plurality of units of block data, generated by dividing storage target data, in a distributed manner in a plurality of storage devices 110, and when attempting to store, in a storage device 110, another piece of storage target data having a data content identical to a data content of storage target data having been stored in a storage device 110, performs duplicate storage elimination by referring to the storage target data having been stored in the storage device 110 as the other piece of storage target data, wherein the data storage controlling unit 101 stores a plurality of continuous units of block data of the storage target data, generated by dividing the storage target data, in a particular storage device 110 among the plurality of storage devices 110, stores, in the particular storage device 110, feature data based on the data content of the block data and storing position information representing the storing position in the particular storage device 110 of the block data in association with each other as a storing position specifying table, and stores storage device identifying information for identifying the particular storage device 110 and the feature data of the block data stored in the particular storage device 110 in association with each other as a storage device specifying table.

(Supplementary Note 2)

The storage system, according to supplementary note 1, wherein the data storage controlling unit refers to the storage device specifying table based on the feature data of block data generated by dividing storage target data to be newly stored so as to specify the particular storage device storing the storing position specifying table including the feature data of the block data, and reads out the storing position specifying table from the particular storage device.

(Supplementary Note 3)

The storage system, according to supplementary note 2, wherein the data storage controlling unit determines whether or not the block data generated by dividing the storage target data to be newly stored has been stored in the storage device, based on the storing position specifying table read out from the particular storage device.

(Supplementary Note 4)

The storage system, according to supplementary note 3, wherein if the feature data of the block data generated by dividing the storage target data to be newly stored does not exist in the storing position specifying table read our from the particular storage device, the data storage controlling unit specifies another particular storage device storing another storing position specifying table including the feature data of the block data by referring to the storage device specifying table based on the feature data of the block data generated by dividing the storage target data to be newly stored, and reads out the other storing position specifying table from the other particular storage device.

(Supplementary Note 5)

The storage system, according to supplementary note 1, further comprising:

at least one first server that controls an operation of storing storage target data into a plurality of storage devices, and a plurality of second servers that constitute the plurality of storage devices, wherein the data storage controlling unit reads out the storing position specifying table from one of the second servers to the first server.

(Supplementary Note 6)

The storage system, according to supplementary note 5, further comprising a plurality of third servers that store the storage device specifying table, wherein the data storage controlling unit stores the storage device specifying table in a distributed manner in the plurality of third servers.

(Supplementary Note 7)

A computer-readable medium storing a program comprising instructions for causing an information processing device to realize, a data storage controlling unit that stores a plurality of units of block data, generated by dividing storage target data, in a distributed manner in a plurality of storage devices, and when attempting to store, in a storage device, another piece of storage target data having a data content identical to a data content of storage target data having been stored in a storage device, performs duplicate storage elimination by referring to the storage target data having been stored in the storage device as the other piece of storage target data, wherein the data storage controlling unit stores a plurality of continuous units of block data of the storage target data generated by dividing the storage target data in a particular storage device among the plurality of storage devices, stores, in the particular storage device, feature data based on a data content of the block data and a storing position information representing a storing position in the particular storage device of the block data in association with each other as a storing position specifying table, and stores storage device identifying information for identifying the particular storage device and the feature data of the block data stored in the particular storage device in association with each other as a storage device specifying table.

(Supplementary Note 8)

The computer-readable medium storing the program according to supplementary note 7, wherein the data storage controlling unit refers to the storage device specifying table based on the feature data of block data generated by dividing storage target data to be newly stored so as to specify the particular storage device storing the storing position specifying table including the feature data of the block data, and reads out the storing position specifying table from the particular storage device.

(Supplementary Note 9)

A data storing method for storing a plurality of units of block data, generated by dividing storage target data, in a distributed manner in a plurality of storage devices, and when attempting to store, in a storage device, another piece of storage target data having a data content identical to a data content of storage target data having been stored in a storage device, performing duplicate storage elimination by referring to the storage target data having been stored in the storage device as the other piece of storage target data, the method comprising, storing a plurality of continuous units of block data of the storage target data generated by dividing the storage target data in a particular storage device among the plurality of storage devices, storing, in the particular storage device, feature data based on a data content of the block data and a storing position information representing a storing position in the particular storage device of the block data in association with each other as a storing position specifying table, and storing storage device identifying information for identifying the particular storage device and the feature data of the block data stored in the particular storage device in association with each other as a storage device specifying table.

(Supplementary Note 10)

The data storing method, according to supplementary note 9, further comprising, referring to the storage device specifying table based on the feature data of block data generated by dividing storage target data to be newly stored so as to specify the particular storage device storing the storing position specifying table including the feature data of the block data, and reading out the storing position specifying table from the particular storage device.

The invention claimed is:

1. A storage system, comprising
a data storage controlling unit that stores a plurality of units of block data, generated by dividing storage target data, in a distributed manner in a plurality of storage devices, and when attempting to store, in a storage device, another piece of storage target data having a data content identical to a data content of storage target data having been stored in a storage device, performs duplicate storage elimination by referring to the storage target data having been stored in the storage device as the other piece of storage target data, wherein
the data storage controlling unit stores a plurality of continuous units of block data of the storage target data, generated by dividing the storage target data, in a particular storage device among the plurality of storage devices, stores, in the particular storage device, feature data based on a data content of the block data and storing position information representing a storing position in the particular storage device of the block data in association with each other as a storing position specifying table, and stores storage device identifying information for identifying the particular storage device and the feature data of the block data stored in the particular storage device in association with each other as a storage device specifying table,
wherein
if the feature data of the block data generated by dividing the storage target data to be newly stored does not exist in the storing position specifying table read out from the particular storage device, the data storage controlling unit specifies another particular storage device storing another storing position specifying table including the feature data of the block data by referring to the storage device specifying table based on the feature data of the block data generated by dividing the storage target data to be newly stored, and reads out the other storing position specifying table from the other particular storage device.

2. The storage system, according to claim 1, wherein
the data storage controlling unit refers to the storage device specifying table based on the feature data of block data generated by dividing storage target data to be newly stored so as to specify the particular storage device storing the storing position specifying table including the feature data of the block data, and reads out the storing position specifying table from the particular storage device.

3. The storage system, according to claim 2, wherein
the data storage controlling unit determines whether or not the block data generated by dividing the storage target data to be newly stored has been stored in the storage device, based on the storing position specifying table read out from the particular storage device.

4. The storage system, according to claim 1, further comprising:
at least one first server that controls an operation of storing storage target data into a plurality of storage devices, and
a plurality of second servers that constitute the plurality of storage devices, wherein
the data storage controlling unit reads out the storing position specifying table from one of the second servers to the first server.

5. The storage system, according to claim 4, further comprising
a plurality of third servers that store the storage device specifying table, wherein
the data storage controlling unit stores the storage device specifying table in a distributed manner in the plurality of third servers.

6. A non-transitory computer-readable storage medium storing a program comprising instructions for causing an information processing device to realize,
a data storage controlling unit that stores a plurality of units of block data, generated by dividing storage target data, in a distributed manner in a plurality of storage devices, and when attempting to store, in a storage device, another piece of storage target data having a data content identical to a data content of storage target data having been stored in a storage device, performs duplicate storage elimination by referring to the storage target data having been stored in the storage device as the other piece of storage target data, wherein
the data storage controlling unit stores a plurality of continuous units of block data of the storage target data, generated by dividing the storage target data, in a particular storage device among the plurality of storage devices, stores, in the particular storage device, feature data based on a data content of the block data and storing position information representing a storing position in the particular storage device of the block data in association with each other as a storing position specifying table, and stores storage device identifying information for identifying the particular storage device and the feature data of the block data stored in the particular storage device in association with each other as a storage device specifying table
wherein
if the feature data of the block data generated by dividing the storage target data to be newly stored does not exist in the storing position specifying table read out from the particular storage device, the data storage controlling unit specifies another particular storage device storing another storing position specifying table including the feature data of the block data by referring to the storage device specifying table based on the feature data of the block data generated by dividing the storage target data to be newly stored, and reads out the other storing position specifying table from the other particular storage device.

7. The non-transitory computer-readable storage medium storing the program according to claim 6, wherein the data storage controlling unit refers to the storage device specifying table based on the feature data of block data generated by dividing storage target data to be newly stored so as to specify the particular storage device storing the storing position specifying table including the feature data of the block data, and reads out the storing position specifying table from the particular storage device.

8. A data storing method for storing a plurality of units of block data, generated by dividing storage target data, in a distributed manner in a plurality of storage devices, and when attempting to store, in a storage device, another piece of storage target data having a data content identical to a data content of storage target data having been stored in a storage device, performing duplicate storage elimination by referring to the storage target data having been stored in the storage device as the other piece of storage target data, the method comprising, storing a plurality of continuous units of block data of the storage target data, generated by dividing the storage target data, in a particular storage device among the plurality of storage devices, storing, in the particular storage device, feature data based on a data content of the block data and storing position information representing a storing position in the particular storage device of the block data in association with each other as a storing position specifying table, and storing storage device identifying information for identifying the particular storage device and the feature data of the block data stored in the particular storage device in association with each other as a storage device specifying table wherein if the feature data of the block data generated by dividing the storage target data to be newly stored does not exist in the storing position specifying table read out from the particular storage device, the data storage controlling unit specifies another particular storage device storing another storing position specifying table including the feature data of the block data by referring to the storage device specifying table based on the feature data of the block data generated by dividing the storage target data to be newly stored, and reads out the other storing position specifying table from the other particular storage device.

9. The data storing method, according to claim 8, further comprising, referring to the storage device specifying table based on the feature data of block data generated by dividing storage target data to be newly stored so as to specify the particular storage device storing the storing position specifying table including the feature data of the block data, and reading out the storing position specifying table from the particular storage device.

* * * * *

UNITED STATES PATENT AND TRADEMARK OFFICE
CERTIFICATE OF CORRECTION

PATENT NO. : 9,256,368 B2
APPLICATION NO. : 13/640130
DATED : February 9, 2016
INVENTOR(S) : Michal Welnicki, Jerzy Szczepkowski and Cezary Dubnicki It is certified that error appears in the above-identified patent and that said Letters Patent is hereby corrected as shown below:

Specification

Column 24, Line 22: Delete "storage" and insert --index--

Column 24, Line 25: Delete "storage" and insert --index--

Column 25, Line 3: Delete "1A." and insert --10A.--

Column 25, Line 9: Delete "1A," and insert --10A,--

Column 26, Line 39: Delete "1A." and insert --10A.--

Column 27, Line 11: Delete "10B" and insert --10C--

Signed and Sealed this
Twenty-sixth Day of July, 2016

Michelle K. Lee
*Director of the United States Patent and Trademark Office*